United States Patent
Hopper et al.

(10) Patent No.: US 7,268,410 B1
(45) Date of Patent: Sep. 11, 2007

(54) INTEGRATED SWITCHING VOLTAGE REGULATOR USING COPPER PROCESS TECHNOLOGY

(75) Inventors: Peter J. Hopper, San Jose, CA (US); Peter Johnson, Sunnyvale, CA (US); Kyuwoon Hwang, Palo Alto, CA (US); Robert Drury, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 93 days.

(21) Appl. No.: 11/041,658

(22) Filed: Jan. 24, 2005

(51) Int. Cl.
*H01L 29/00* (2006.01)
(52) U.S. Cl. .................. 257/531; 257/379; 257/516; 257/548; 257/E27.009; 323/282
(58) Field of Classification Search .................. 257/19, 257/548, 379, 516, 531, E27.009
See application file for complete search history.

(56) References Cited

U.S. PATENT DOCUMENTS

| | | | | |
|---|---|---|---|---|
| 5,355,301 A | * | 10/1994 | Saito et al. | 363/147 |
| 6,573,818 B1 | | 6/2003 | Klemmer et al. | 336/83 |
| 6,624,498 B2 | | 9/2003 | Filas et al. | 257/528 |
| 6,674,131 B2 | * | 1/2004 | Yokogawa et al. | 257/379 |
| 6,696,744 B2 | | 2/2004 | Feygenson et al. | 257/531 |
| 2002/0125537 A1 | * | 9/2002 | Wong et al. | 257/368 |

* cited by examiner

*Primary Examiner*—Howard Weiss
*Assistant Examiner*—John C Ingham
(74) *Attorney, Agent, or Firm*—Stallman & Pollock LLP

(57) ABSTRACT

Improvements in the level of integration of a core buck and/or boost DC-DC voltage regulator sub-circuit lead to a lower manufacturing cost structure, an improved performance from lessened intrinsic parasitic resistance, a smaller die size and, thus, higher wafer yield. Further, by integrating certain components on-chip, the cost and complexity of the conventional hybrid circuit implementation is improved.

12 Claims, 42 Drawing Sheets

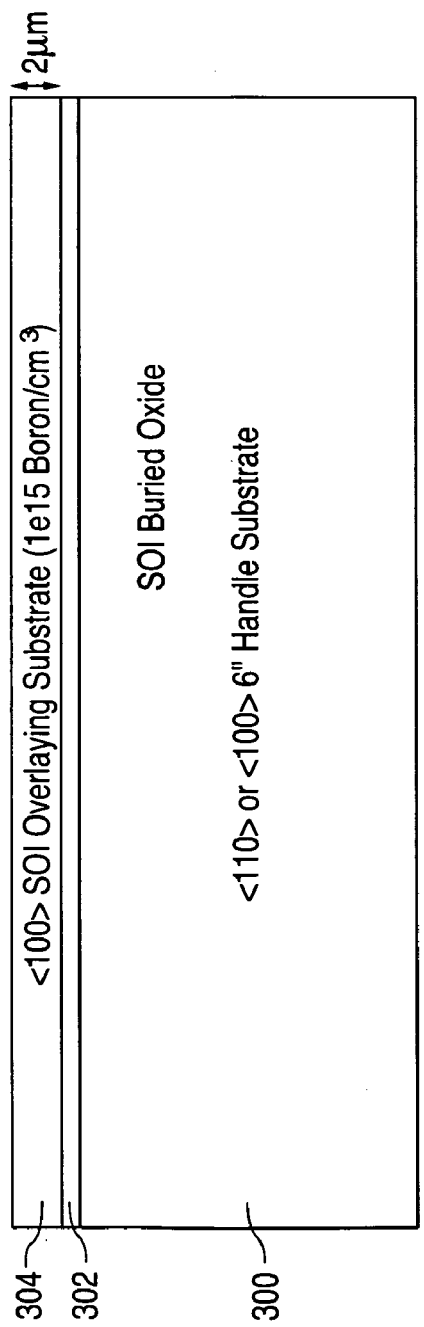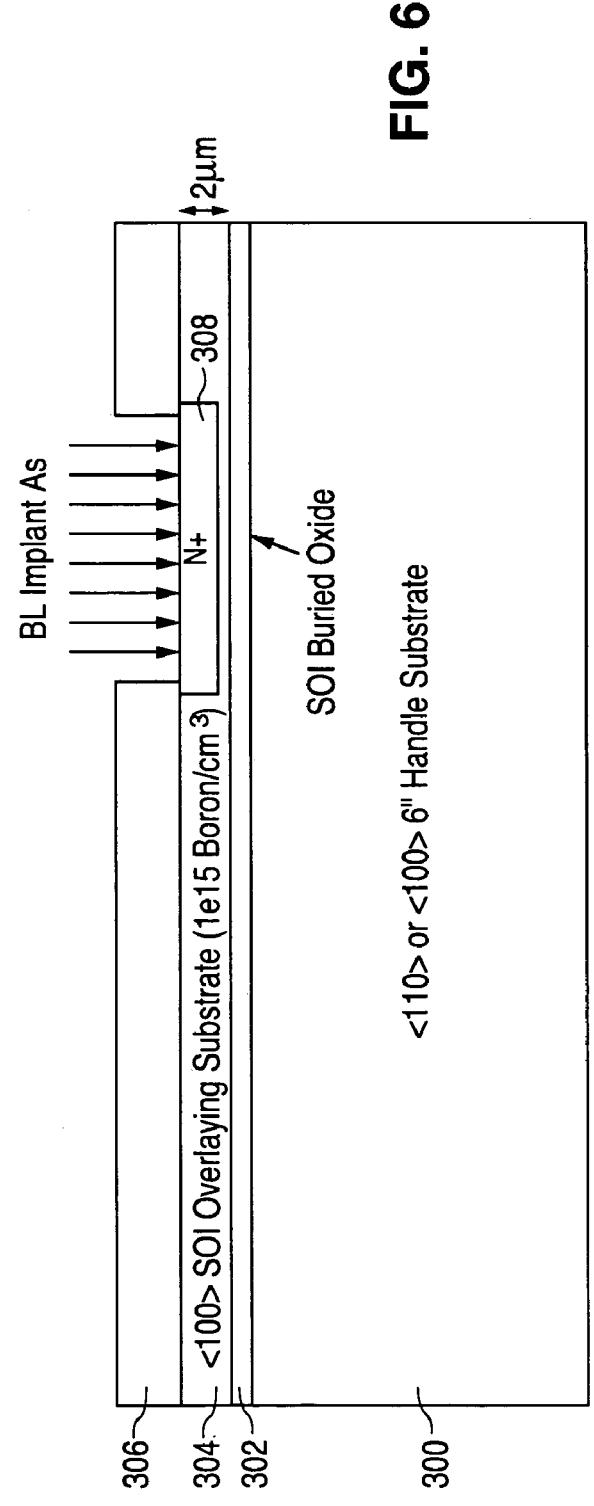

INTEGRATED SWITCHING VOLTAGE REGULATOR USING COPPER PROCESS TECHNOLOGY

TECHNICAL FIELD

The present invention relates to a highly coupled process scheme that yields a fully integrated DC-DC switching regulator circuit with very high on-state resistance performance.

DESCRIPTION OF THE DRAWINGS

FIGS. 5-43 provide partial cross section drawings illustrating an embodiment of a sequence of processing steps utilizable in fabricating the FIG. 4 fully integrated DC-DC switching regulator circuit structure in accordance with the concepts of the present invention.

DESCRIPTION OF THE INVENTION

The use of switching regulators is increasing in popularity because they offer the advantages of higher power conversion efficiency, increased design flexibility, and allowing multiple output voltages of different polarities to be generated from a single input voltage.

In accordance with the well-known law of inductance, if a voltage is forced across an inductor, a current will flow through the inductor, and this current will vary with time. The current flowing in the inductor will be time varying even if the forcing voltage is constant. It is equally true that if a time-varying current is forced to flow in an inductor, a voltage across the inductor will result. The fundamental law that defines the relationship between the voltage and current in an inductor is given by the equation:

$$V = L(di/dt)$$

Thus, current that is constant with time has a di/dt value of zero and results in no voltage across the inductor. A current that is increasing with time has a positive di/dt value, resulting in a positive inductor voltage. Current that decreases with time gives a negative value for di/dt and, thus, for inductor voltage.

Two commonly used switching voltage regulators are the Buck regulator, which reduces a DC input voltage to a lower DC voltage of the same polarity, and the Boost regulator, which provides an output voltage that is higher than the input voltage.

Figure 1:
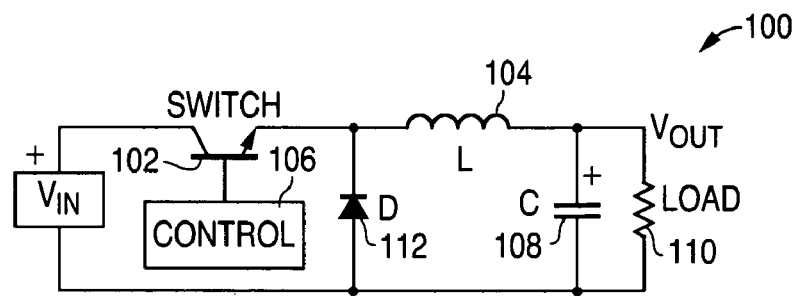
FIG. 1 is a circuit diagram illustrating a conventional Buck regulator.

FIG. 1 shows a conventional Buck regulator circuit 100. The Buck regulator circuit 100 uses a transistor 102 as switch that alternately connects and disconnects an input voltage to an inductor 104. The switching transistor 102 is shown in FIG. 1 as being an NPN bipolar device, but those skilled in the art will readily appreciate that the transistor 102 may also be an MOS device. FIG. 1 also shows the input voltage to the switching transistor 102 as being provided by a pulse width modulation (PWM) control circuit 106. As is well understood by those skilled in the art, the series of square wave pulses applied by the PWM circuit to the L-C filter (L=inductor 104, C=capacitor 108) provides a DC output voltage that is equal to the peak pulse amplitude multiplied by the duty cycle, the duty cycle being the "on" time of the switching transistor 102 divided by the total period. Thus, the output voltage of the Buck regulator circuit 100 can be directly controlled by changing the "on" time of the transistor 102.

With further reference to FIG. 1, when the switching transistor 102 turns on, the input voltage $V_{IN}$ is connected to the inductor 104. The difference between the input voltage $V_{IN}$ and the output voltage $V_{OUT}$ is then forced across the inductor, causing the current through the inductor 104 to increase. During the "on" time, the inductor current flows both into the load (shown in FIG. 1 as resistor 110) and the output capacitor 108, charging the capacitor 108 during this time. When the switching transistor 102 is turned off, the input voltage $V_{IN}$ applied to the inductor 104 is removed. However, since the current in an inductor cannot change instantaneously, the voltage across the inductor 104 will adjust to hold the current constant. The input end of the inductor 104 is forced negative in voltage by the decreasing current, eventually reaching the point where the diode 112 is turned on. The inductor current then flows through the load 110 and back through the diode 112. The capacitor 108 discharges into the load 110 during the "off" time of the switching transistor 102, contributing to the total current being supplied to the load 110. Thus, the current through the inductor 104 ramps up when the switching transistor is on, and ramps down when the switch 102 is off. The DC load current from the regulated output is the average value of the inductor current.

Figure 2:
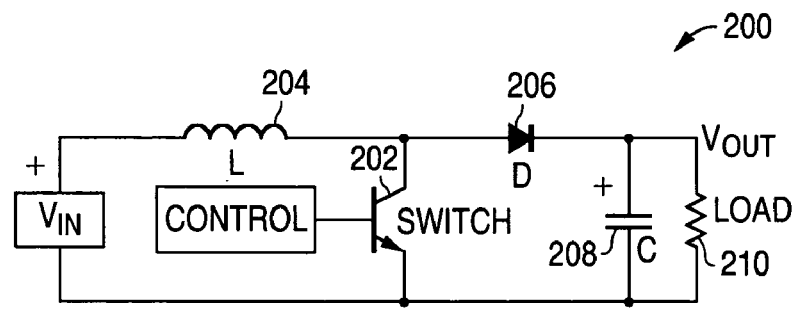
FIG. 2 is a circuit diagram illustrating a conventional Boost regulator.

A conventional Boost regulator circuit 200 is shown in FIG. 2. As stated above, the Boost regulator circuit 200 takes a DC input voltage $V_{IN}$ and produces a DC output voltage $V_{OUT}$ that is higher in value than the input voltage $V_{IN}$ but of the same polarity.

With reference to FIG. 2, when the switching transistor 202 is on, the input voltage $V_{IN}$ is forced across the inductor 204, causing the current through the inductor 204 to increase (ramp up). When the switching transistor 202 is off, the decreasing inductor current forces the "switch" end of the inductor 204 to swing positive. This forward biases the diode 206, allowing the capacitor 208 to charge up to a voltage that is higher than the input voltage $V_{IN}$. During steady-state operation, the inductor current flows into both the output capacitor 208 and the load 210 during the switch off time. When the switch 202 is on, the load current is supplied only by the capacitor 208.

Conventional switching voltage regulator circuits are typically built as hybrid circuits. That is, the control logic circuitry for the regulator circuit is formed as part of a monolithic integrated circuit die while the power transistor, the inductor, the diode and the capacitor are built as discrete components that are electrically interconnected with the control logic to provide the hybrid circuit.

Hybrid circuits are inherently bulky. With increasing emphasis being place on the size and weight of the hand held electronic devices with which switching regulator circuits are commonly used, it clearly would be desirable to have available a switching regulator circuit of reduced size and weight.

As discussed in greater detail below, the present invention is directed to improvements in the level of integration of a conventional core DC-DC voltage regulator circuit. The improved integration leads to a lower manufacturing cost structure, improved performance resulting from lessened intrinsic parasitic resistance, and smaller die size and thus higher wafer yield. Further, by integrating certain components on chip, the cost and complexity of hybrid circuit implementation is improved. This is accomplished using a complete 3-dimensional integration scheme that includes the power device, the inductor, the diode and the control circuitry.

The features and advantages of the present invention will be more fully appreciated upon consideration of the following detailed description of the invention and the accompanying drawings that set forth an illustrative embodiment in which the principles of the invention are utilized.

Figure 3:
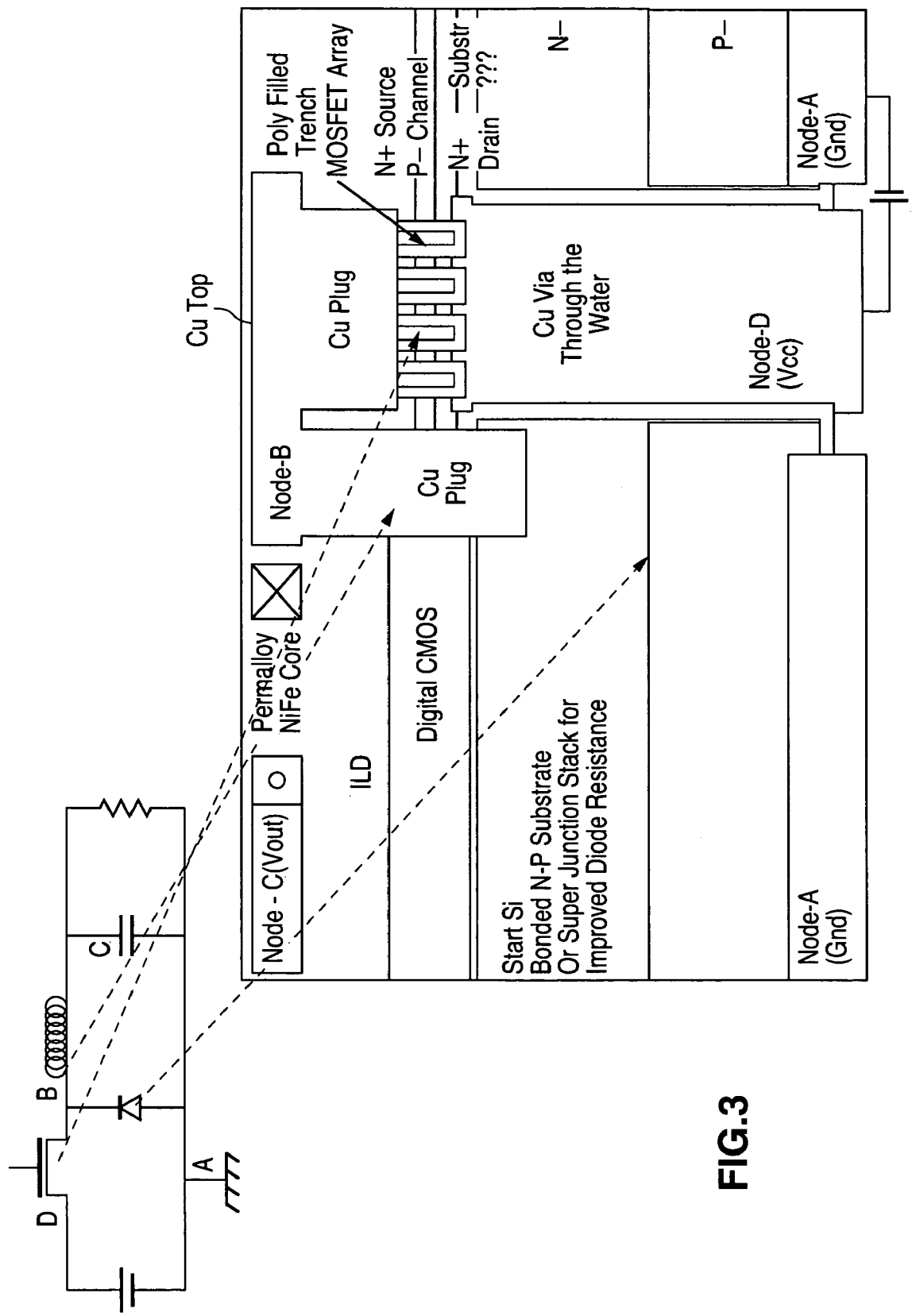
FIG. 3 provides a mapping of a Buck regulator circuit of the type shown in FIG. 1 to a partial cross-section drawing illustrating a fully integrated DC-DC switching regulator circuit structure in accordance with the concepts of the present invention.
Figure 4:
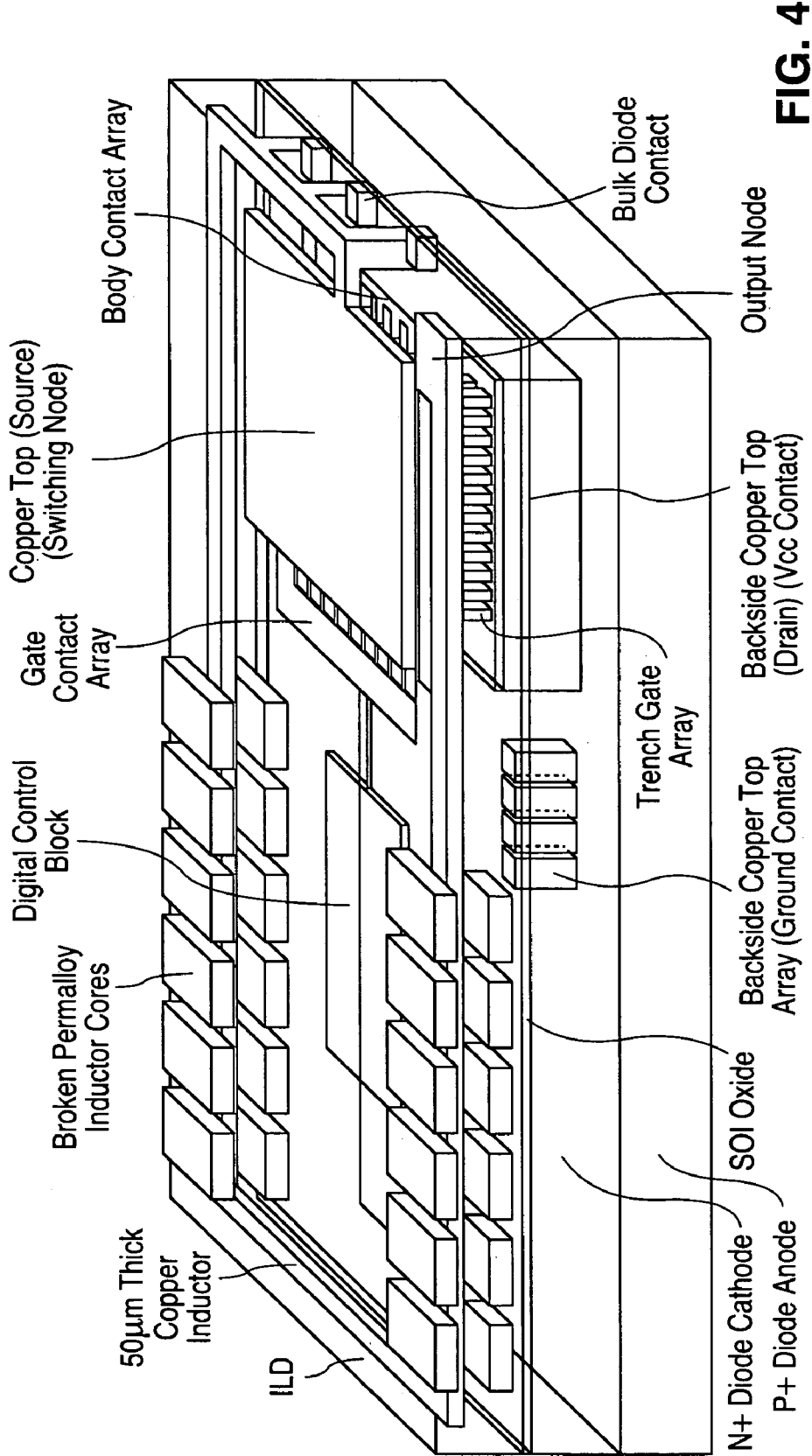
FIG. 4 provides a 3-dimensional schematic drawing illustrating an embodiment of a fully integrated DC-DC switching regulator circuit structure in accordance with the concepts of the present invention.

FIG. 3 shows a mapping of each of the inductor, the switching transistor and the diode elements of the FIG. 1 Buck switching regulator circuit to a two-dimensional cross section of a fully integrated DC-DC switching regulator circuit structure in accordance with the concepts of the present invention. FIG. 4 shows a corresponding three-dimensional embodiment of the structure.

As shown in FIGS. 3 and 4 and discussed in greater detail below, a number of features contribute to the overall, on-chip, integrated design of the disclosed DC-DC switching regulator circuit. Thick copper plating technology is used to provide a very low parasitic resistance path form the vertical transistor to the integrated inductor, thus minimizing I2R loss and the resultant "wasteful" joule heating resulting from the inductor energizing cycle of the switching transient. Optionally, as shown in FIGS. 3 and 4, a Permalloy (NiFe magnetic material, or similar magnetic material, that is readily available commercially, e.g. from Reade Advanced Materials) core is used to elevate the integrated inductor's inductance value to the order of ~100 nH. Large thickness (~5-50 μm) copper layers are used, formed with crude microlithographic geometries for the copper layers. A through-the-wafer conduction path is formed, offering the lowest possible on-sate resistance path when energizing the inductor with the switching transistor. A through-the-wafer trench is formed by etching and seeding with copper. Both the top and bottom copper layers are filled (electroplated), optionally at the same time, thus minimizing processing cost. A vertical trench MOSFET (or bipolar) transistor is used and integrated such that the vertical current path offers minimal on-state resistance. A silicon-on-insulator (SOI) substrate is used to provide isolation from the transistors and ground contact. Optionally, the diode is formed by the use of a stacked n-p layer substrate; this is formed by a specific bonded wafer substrate that may be formed from a single n-p stack. This latter case of n-p-n-p-n-p would constitute a super junction arrangement with related cost versus on-sate resistance trade off. The aspect ration of the back-side trench structure, which requires copper fill, may be better than 2:1, thus avoiding complex fill techniques designed to avoid bread-loafing and topographical pinching off; simple seed and plate processing is sufficient. The large copper vias/plug scheme directly in the vicinity of the heat source (drain area) offers improved heat sinking performance, allowing elevated current densities and, thus, improved area/yield trade-off.

FIGS. 5-43 show a sequential process flow for fabricating an embodiment of a fully integrated DC-DC switching regulator circuit structure in accordance with the present invention.

FIG. 5 shows a SOI buried oxide layer 302 formed on an underlying <110> or <100> 6" handle silicon substrate 300. A <100> SOI overlaying substrate (1e15 Boron/cm³) 304 about 2 μm thick is formed on the SOI buried oxide layer 302. As shown in FIG. 6, a patterned photoresist mask 306 is then used to allow an Arsenic implant into the SOI substrate 304 to provide an N+ buried layer implant region 308.

Figure 7:
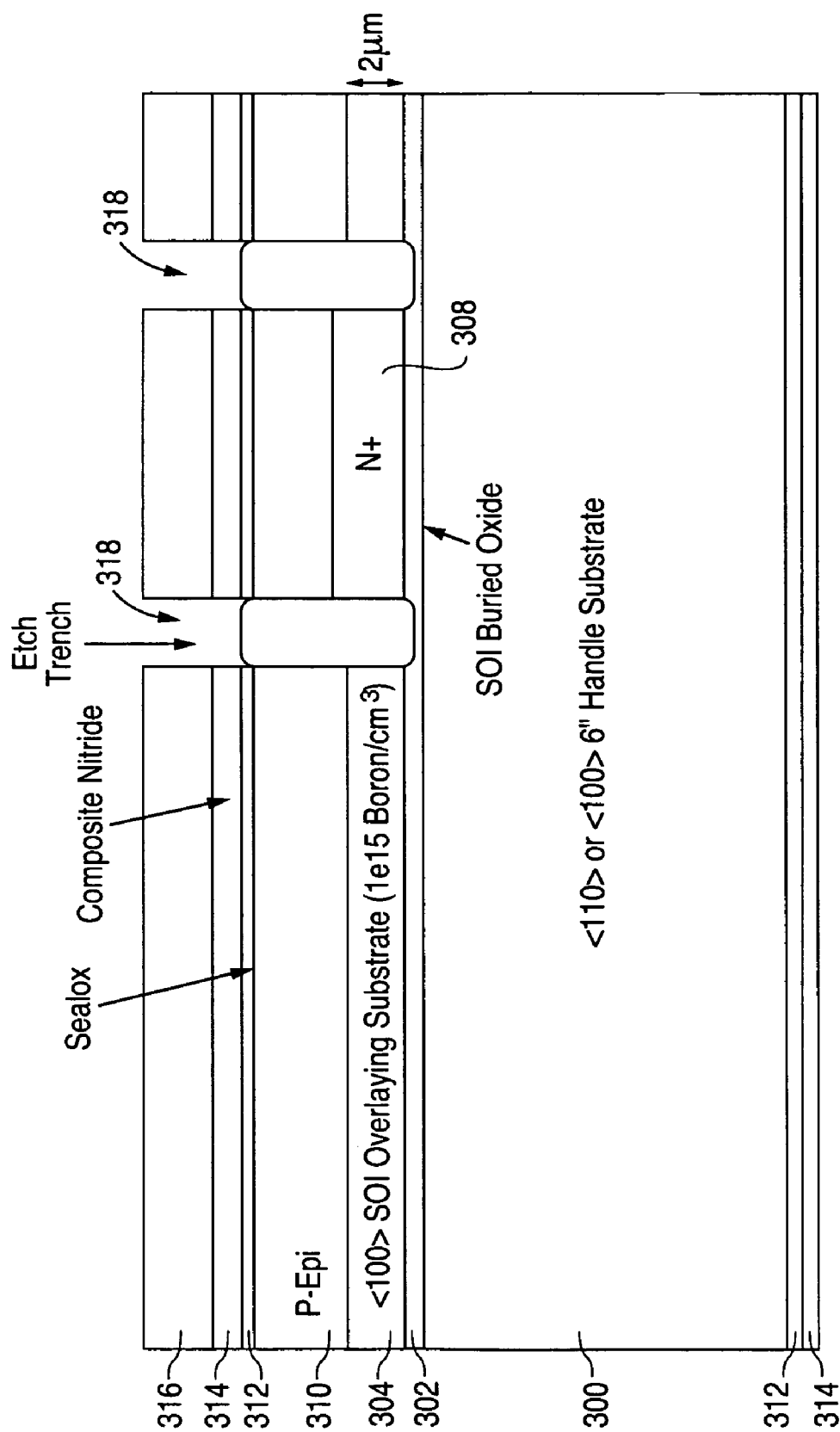

Next, as shown in FIG. 7, a P-epitaxial layer 310 is then formed over the SOI substrate 304, followed by formation of a seal oxide layer 312 and a composite nitride layer 314 on both the frontside and the backside of the wafer. As further shown in FIG. 7, a patterned photomask 316 is then developed and a trench etch step is performed to form trenches 318 at the edges of the N+ buried region 308 down to the level of the SOI buried oxide layer 302.

Figure 8:
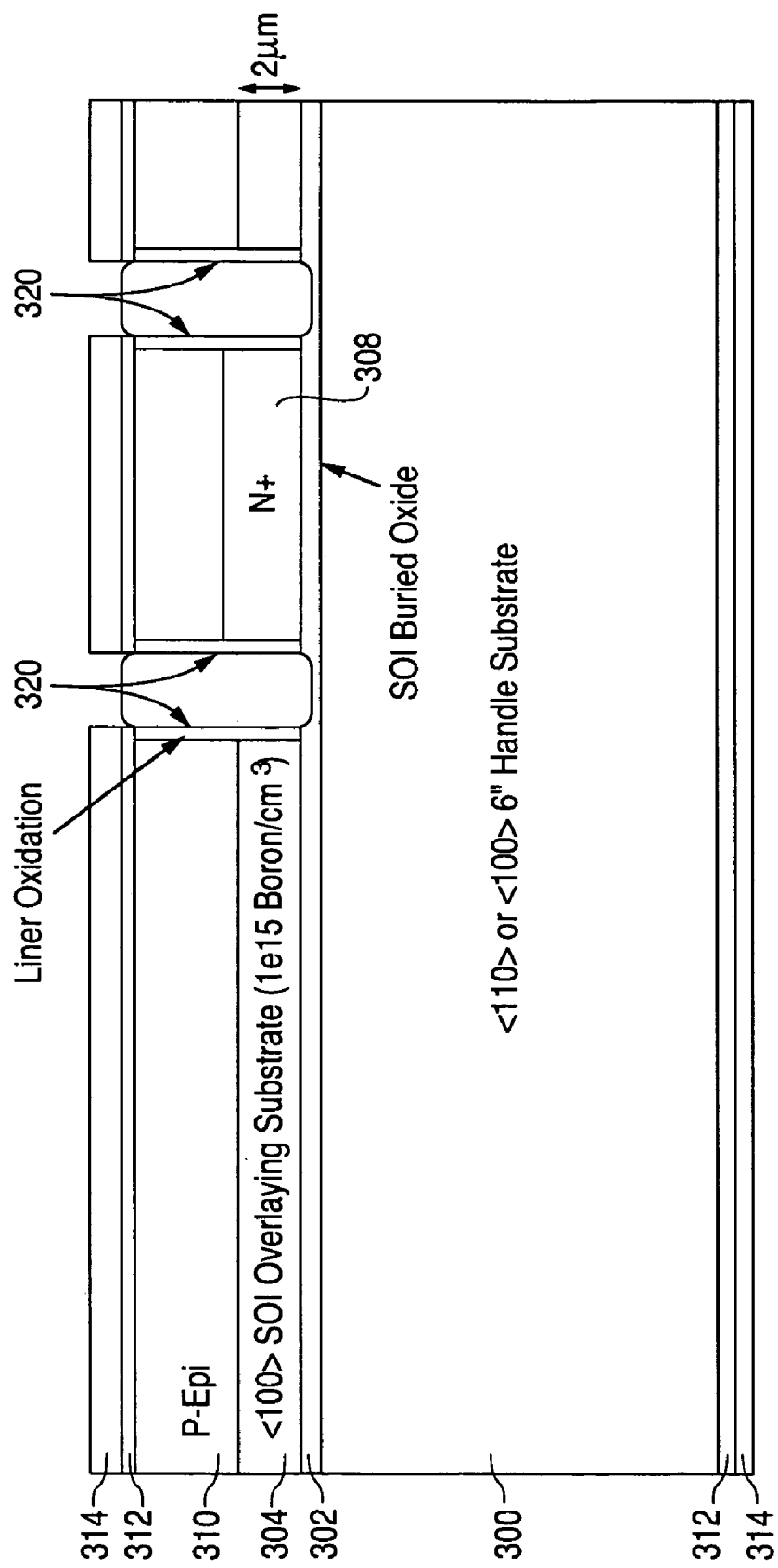
Figure 9:
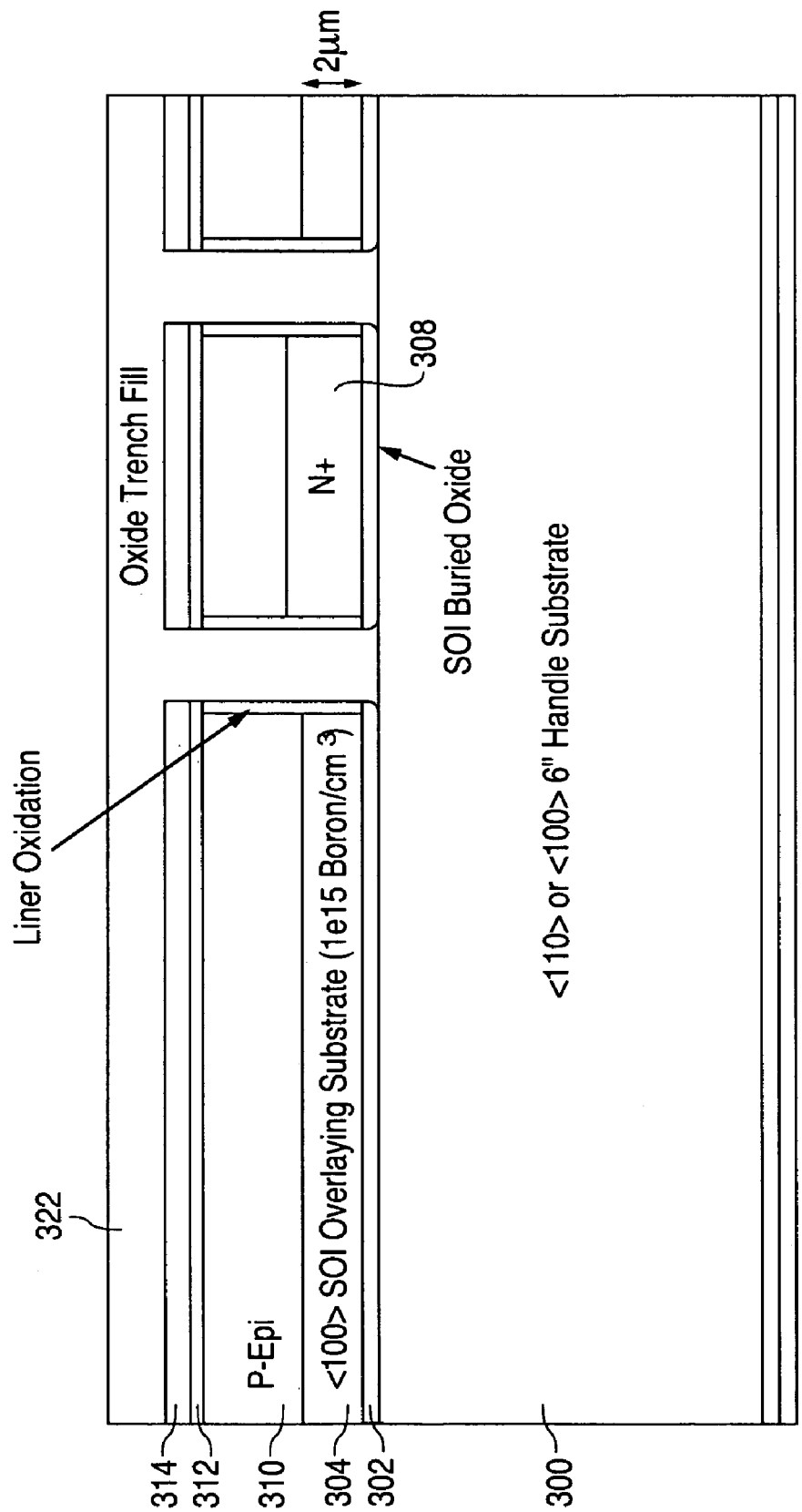
Figure 10:
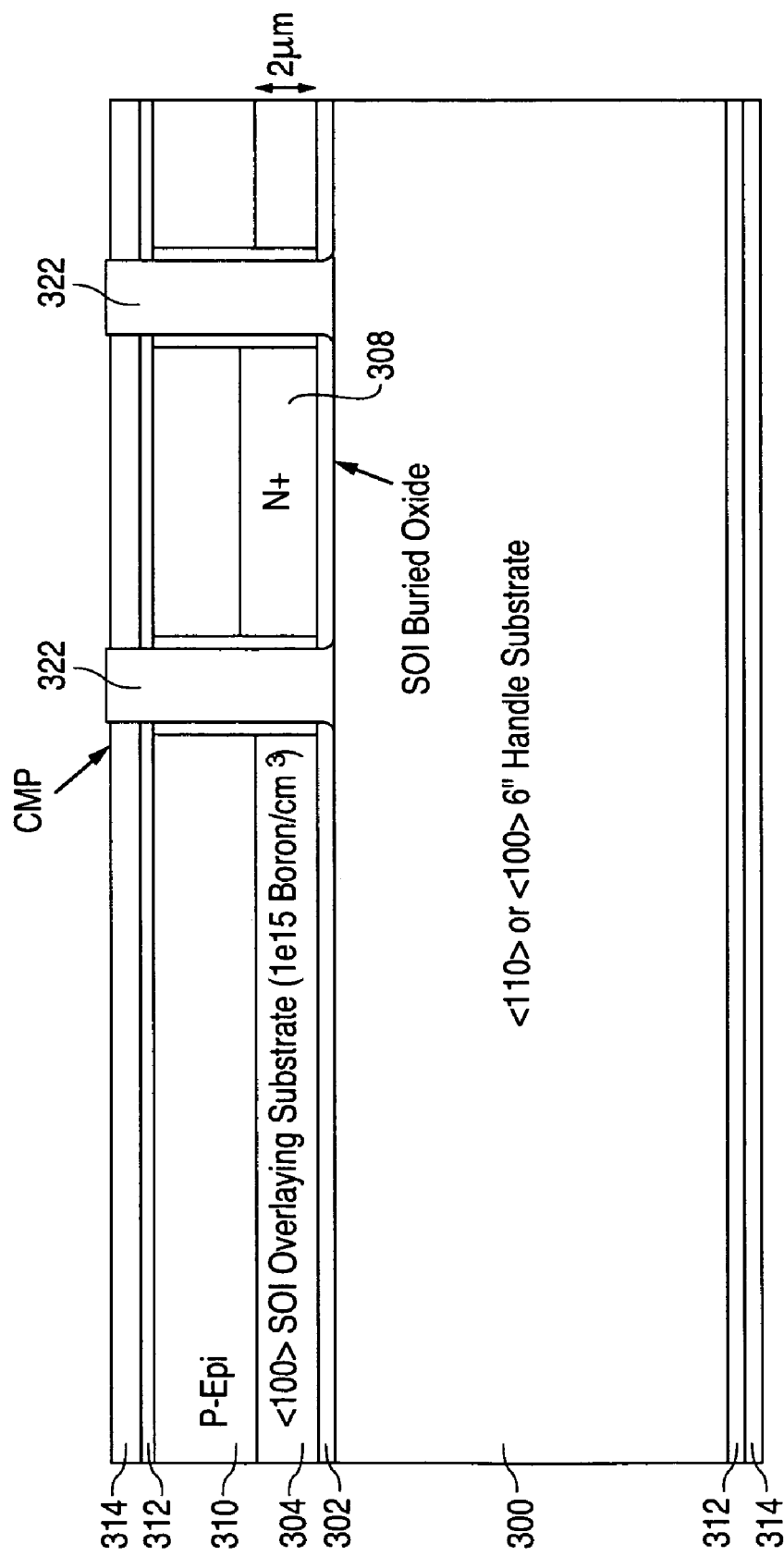
Figure 11:
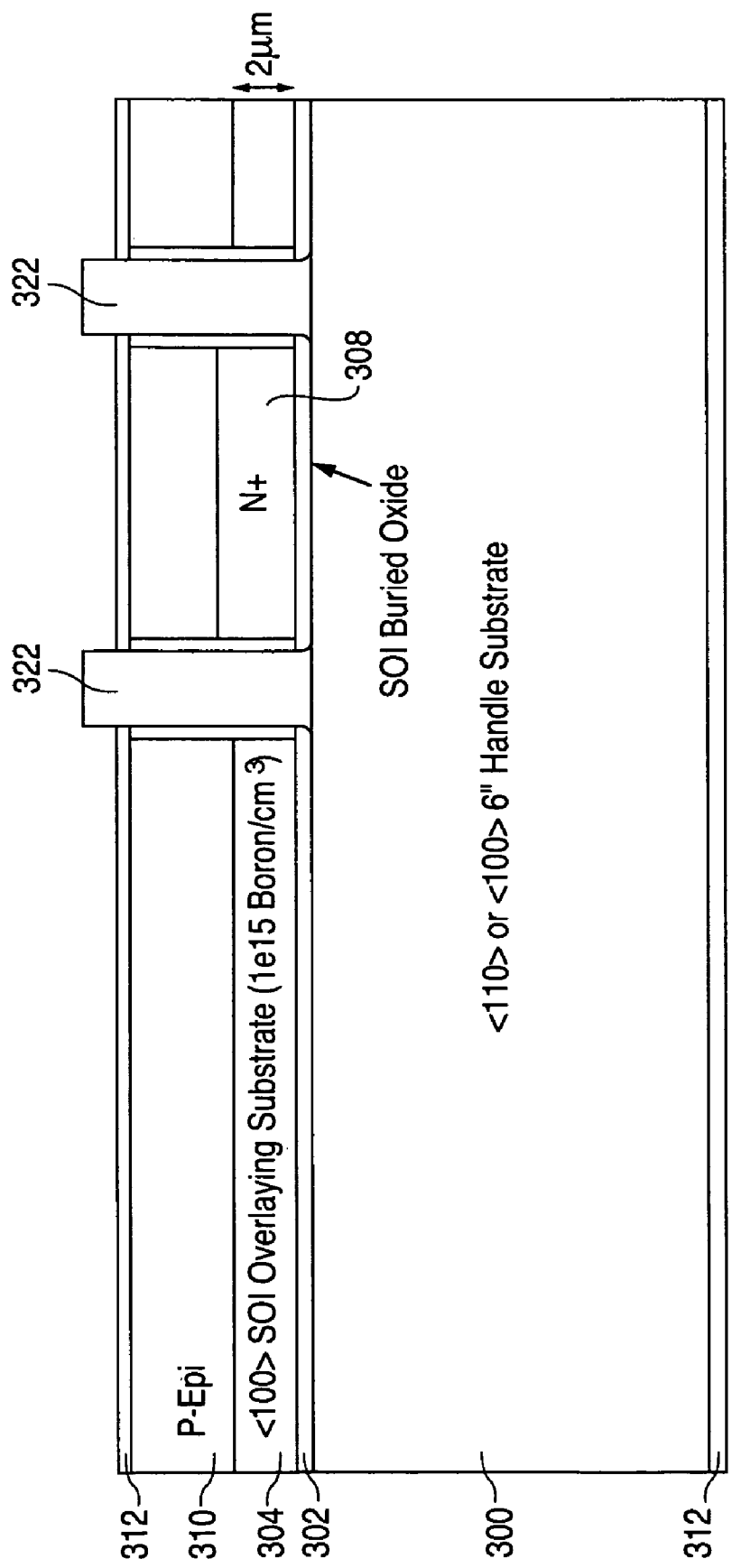
Figure 12:
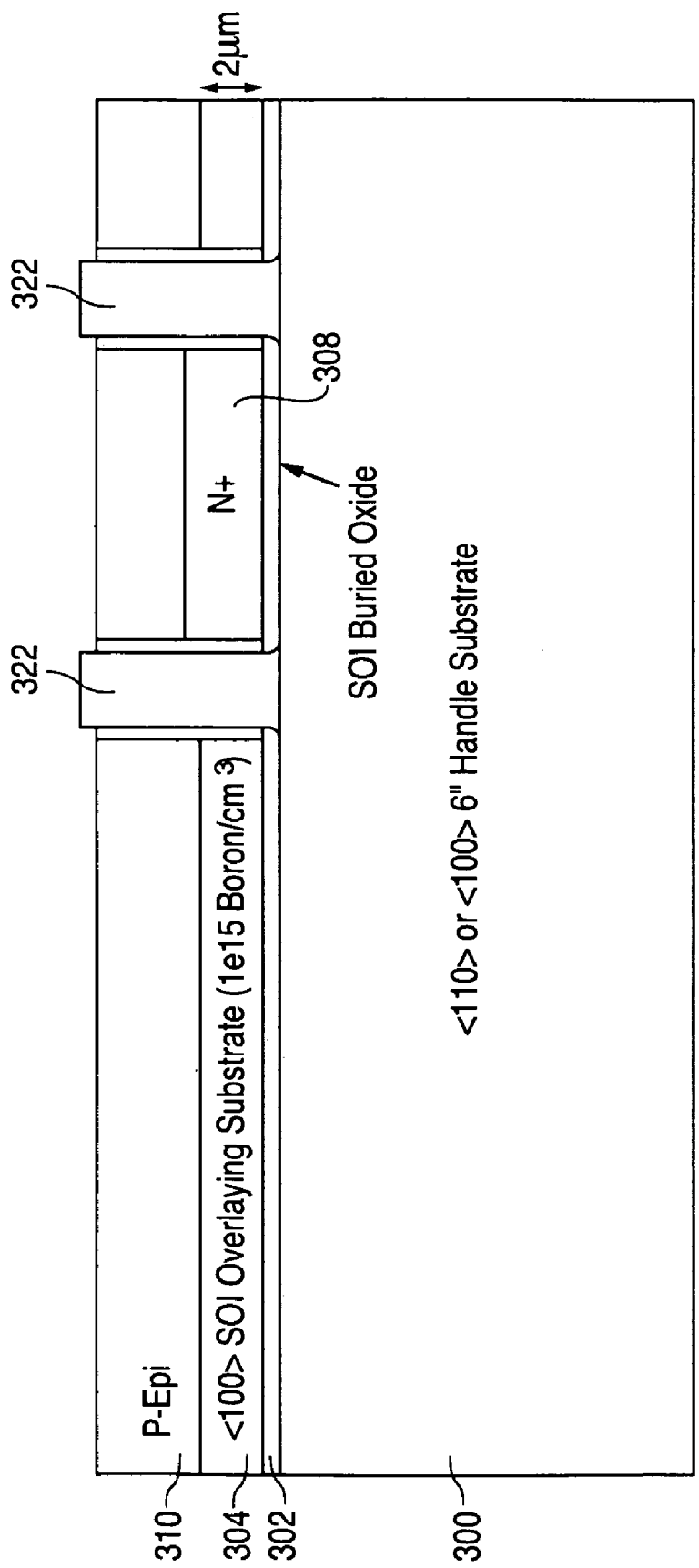
Figure 13:
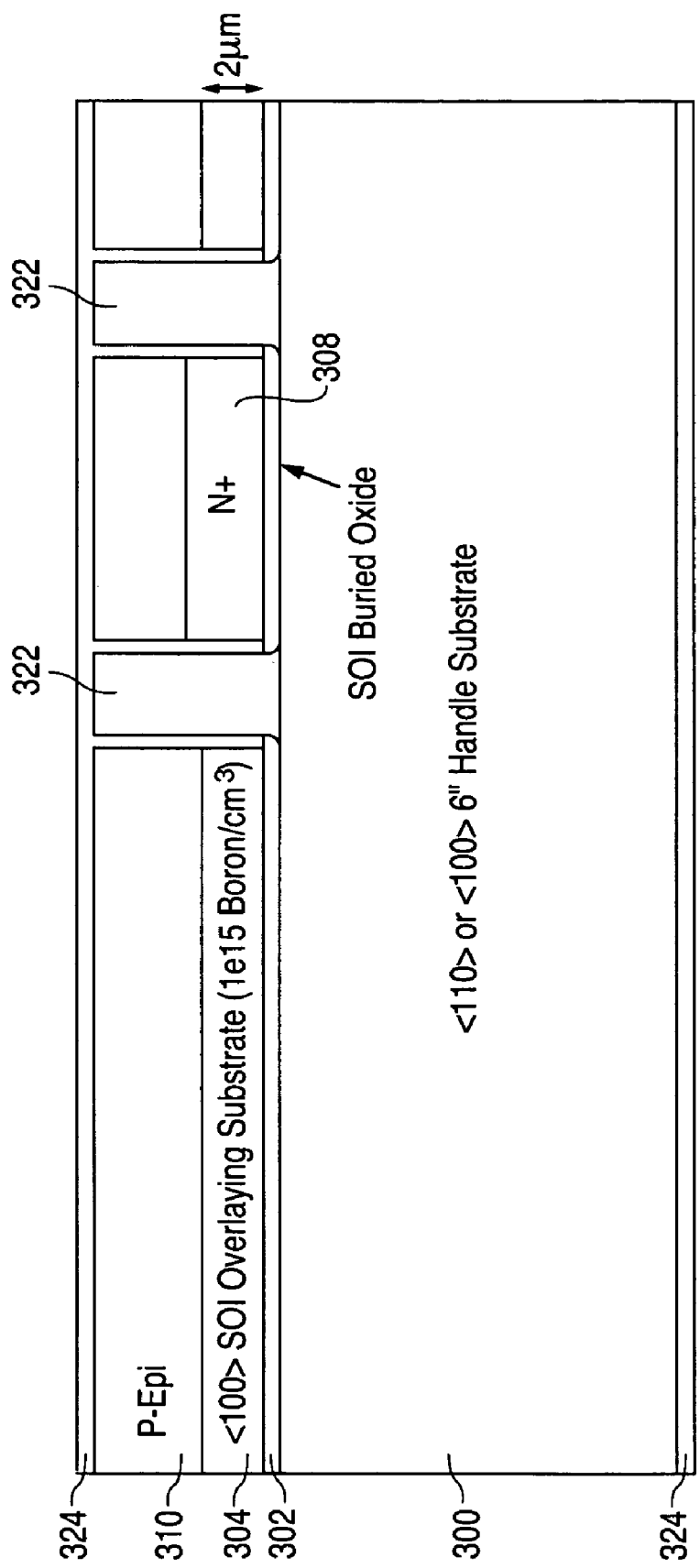
Figure 14:
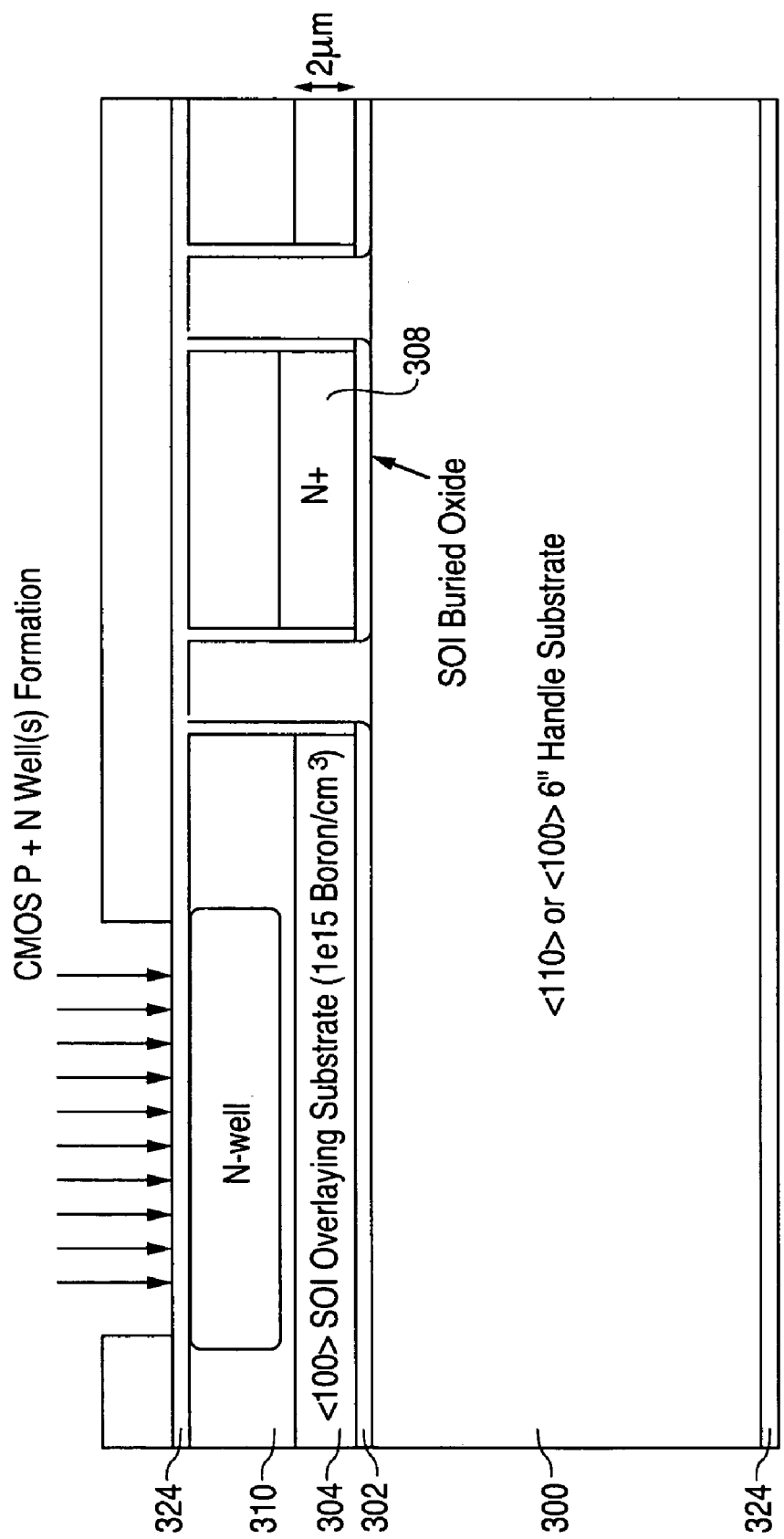

Following formation of liner oxidation 320 on the sidewalls of the trench 318, as shown in FIG. 8, a layer of trench fill oxide 322 is formed to the fill the trenches 318, as shown in FIG. 9, and then planarized by, e.g., chemical mechanical polishing (CMP), as shown in FIG. 10. The composite nitride layers 314 are then remove (FIG. 11), as is the layer of seal oxide 312 in a pre-sacoxide dip (FIG. 12). A layer of sacrificial oxide 324 is then formed on both the frontside and the backside of the wafer (FIG. 13). As shown in FIG. 14, the structure is then masked to facilitate the formation of P and N wells for the CMOS devices of the switching circuit control logic.

Figure 15:
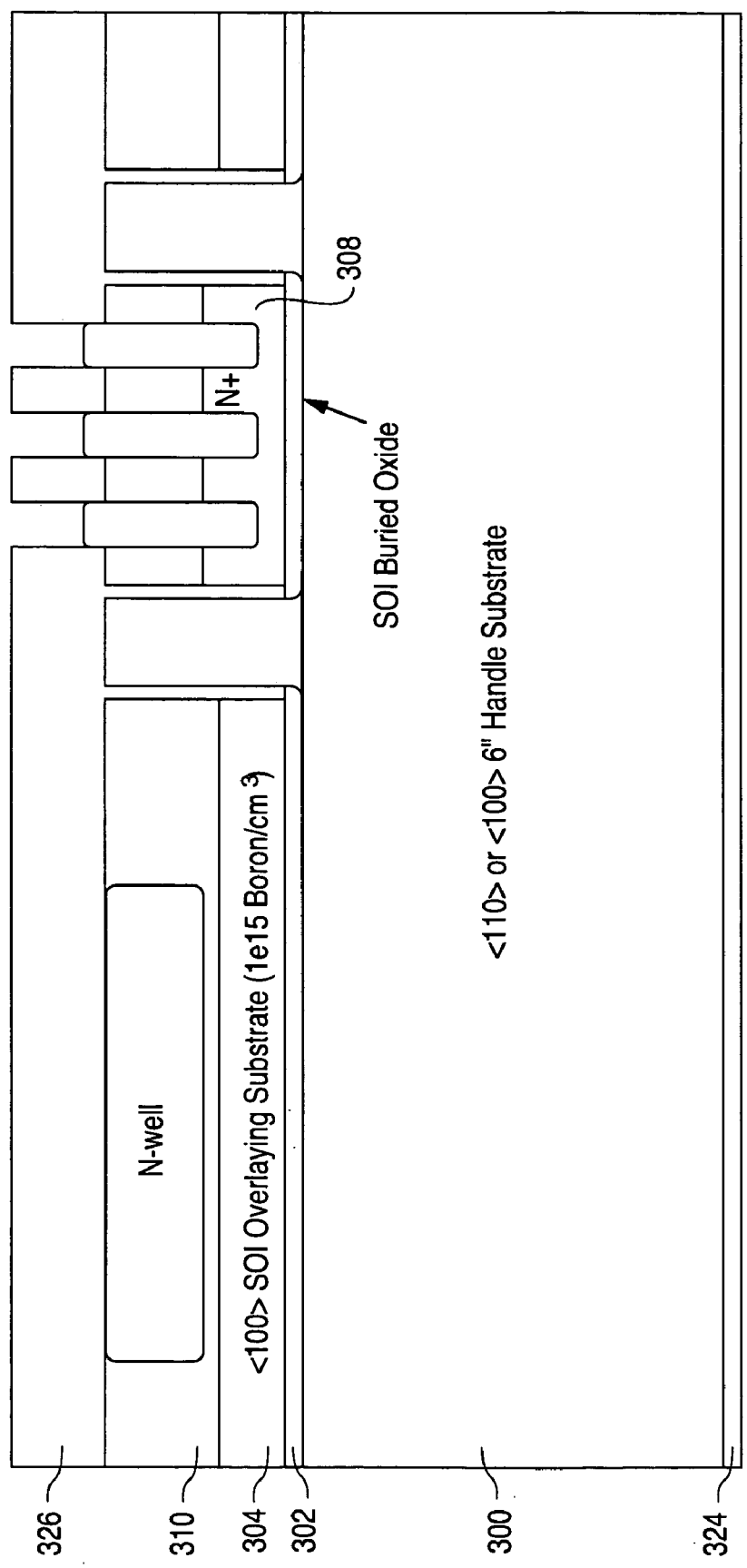
Figure 16:
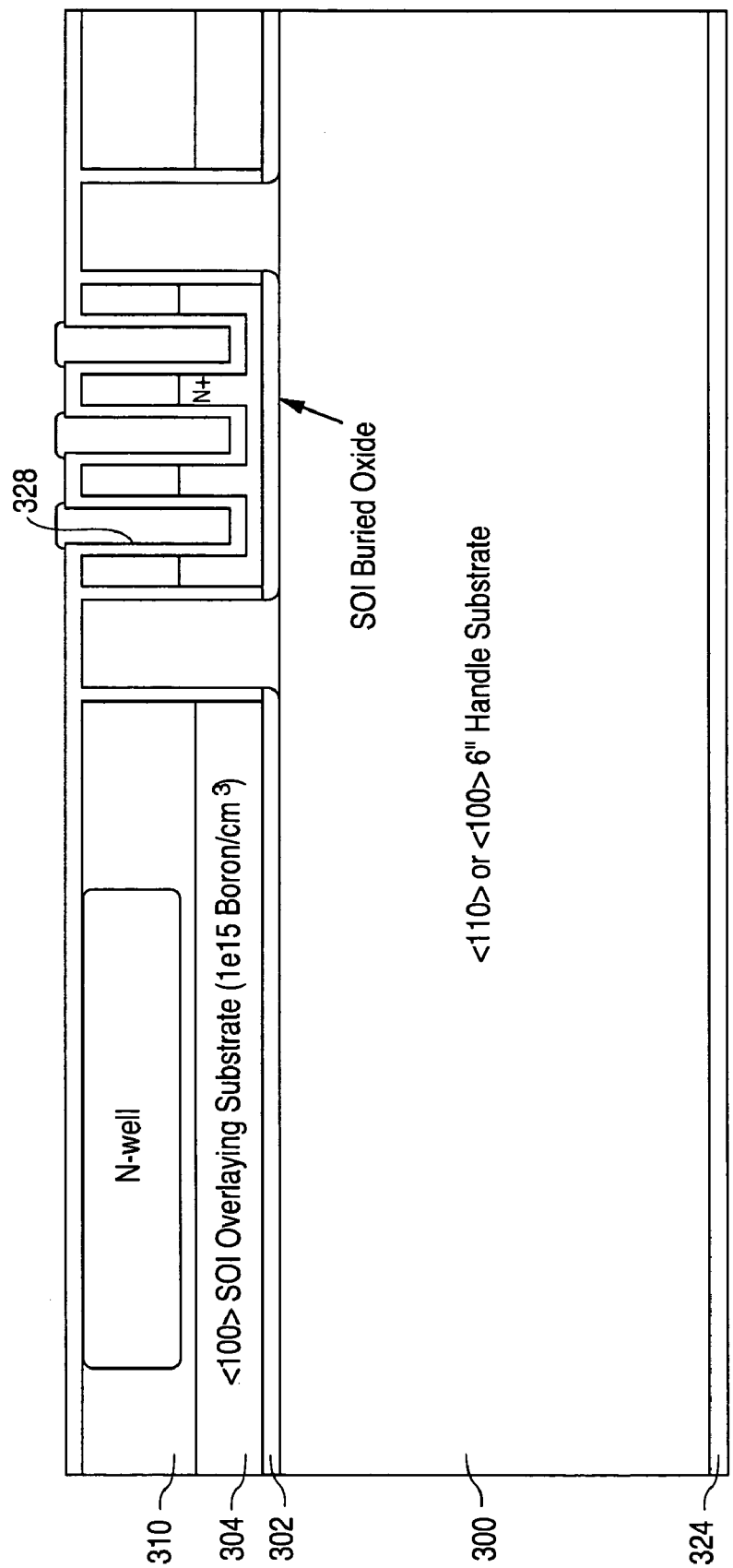

FIG. 15 shows the formation of a photoresist mask 326 that is utilized in the trench gate definition for the switching transistor. As shown in FIG. 16, the photoresist mask 326 is then stripped and layers of gate oxide 328 are formed.

Figure 17:
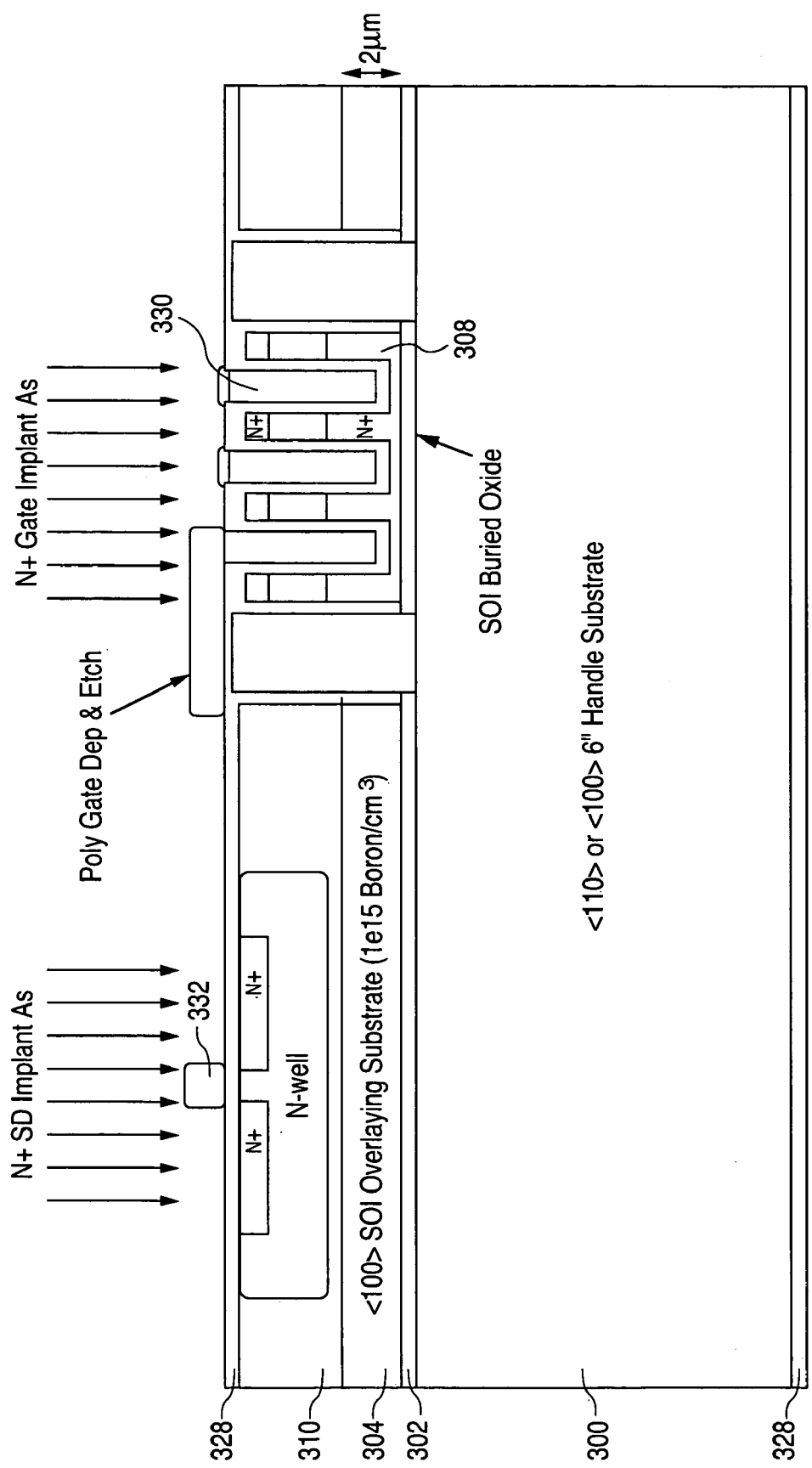
Figure 18:
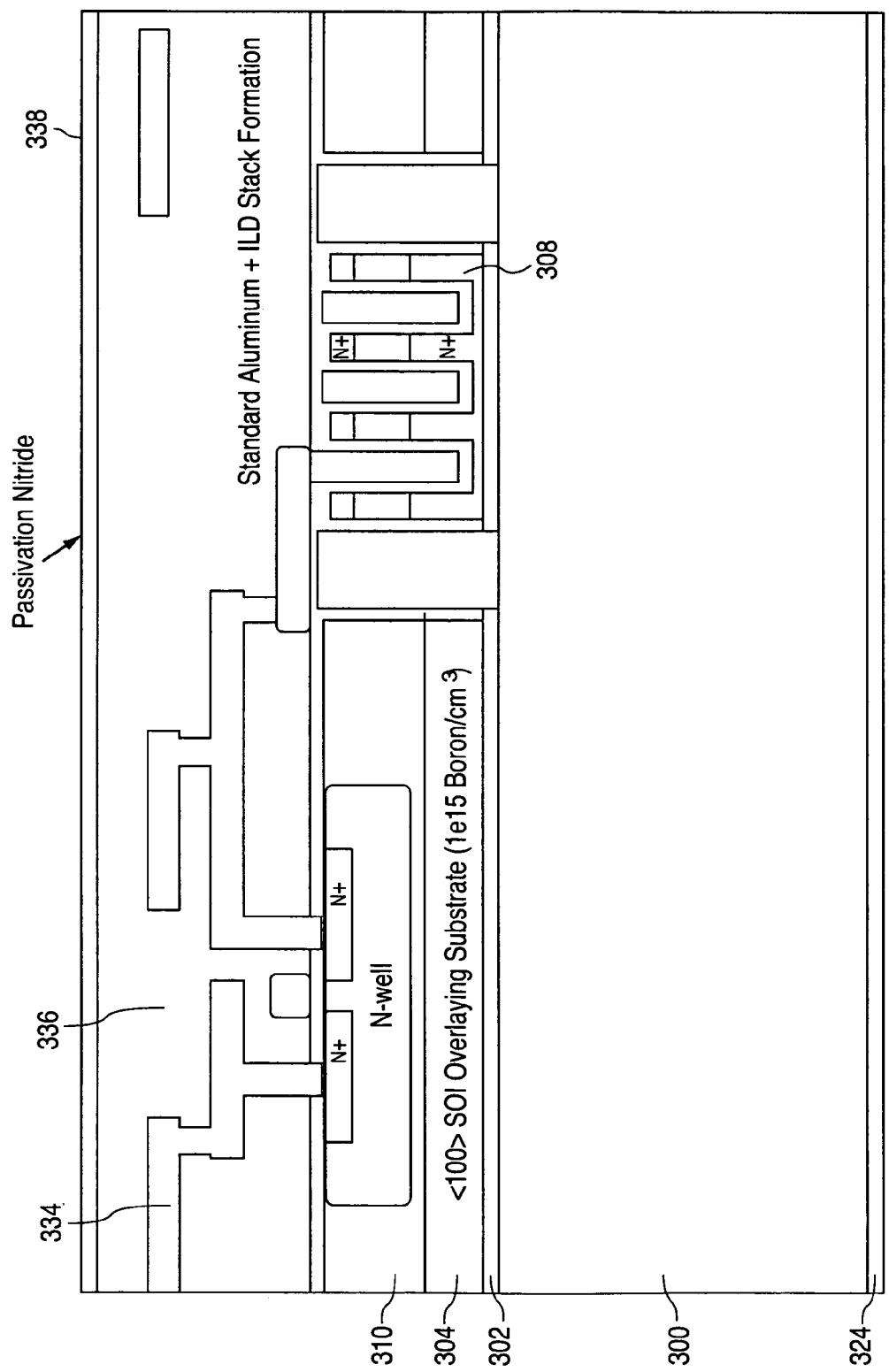

With reference to FIG. 17, a layer of doped polysilicon is then deposited to fill the gate trenches and to overly the sac oxide 328. The poly layer is then etched to define the poly gate electrode 330 of the switching transistor and the gates 332 of the CMOS devices. An Arsenic implant step provides the N+ gate implant for the switching device and the source/drain implant for the PMOS devices. FIG. 18 illustrates the conventional formation of an aluminum interconnect structure 334 and interlayer dielectric (IDL) 336, followed by formation of a nitride passivation layer 338 on both the top and backside of the wafer.

Figure 19:
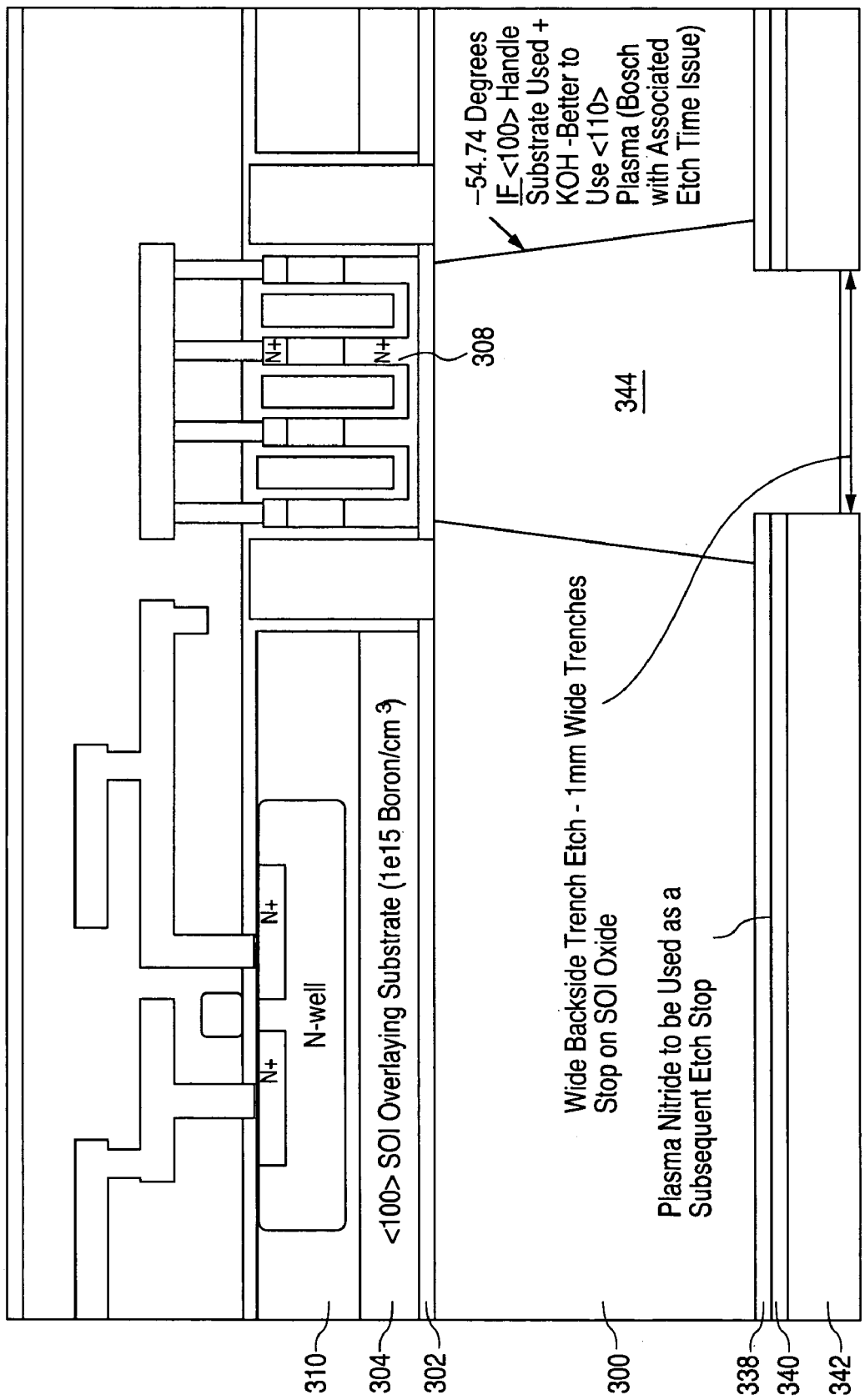

Next, as shown in FIG. 19, plasma nitride 340 is deposited on the backside of the wafer to serve as an etch stop layer. A patterned photoresist mask 342 is then developed on the wafer backside to facilitate the etch of a wide backside trench 344 beneath the switching transistor; as further shown in FIG. 19, the trench etch stops on the layer of SOI oxide 302. Preferably, the trench is approximately 1 mm wide or greater. As noted in FIG. 19, the trench sidewalls should be at an angle of about 55° if a KOH wet etch is used with a <100> handle substrate; it is preferable to use a <110> handle substrate and a KOH etch. Plasma etching can also be used, but may present etch timing issues.

Figure 20:
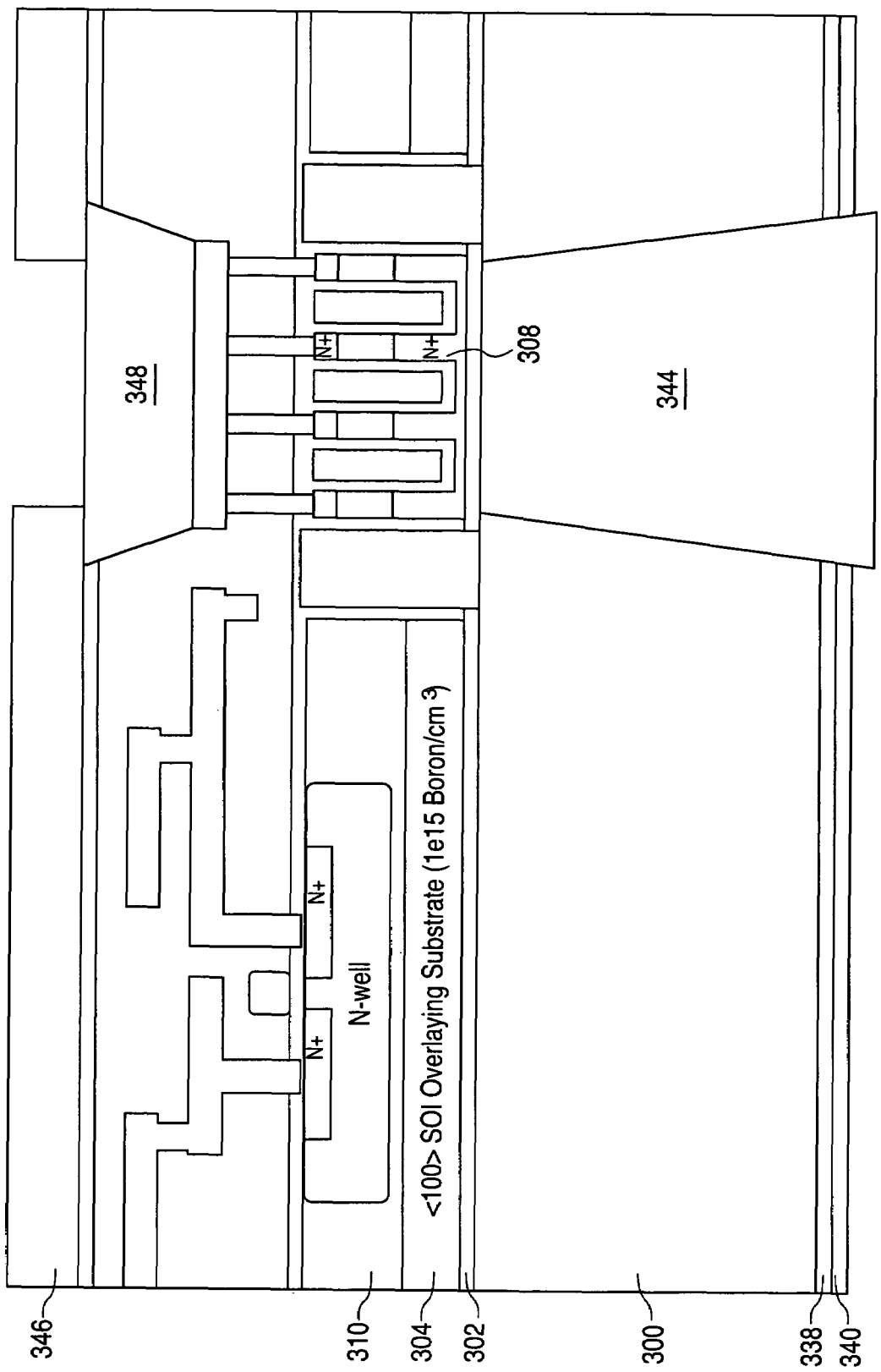
Figure 21:
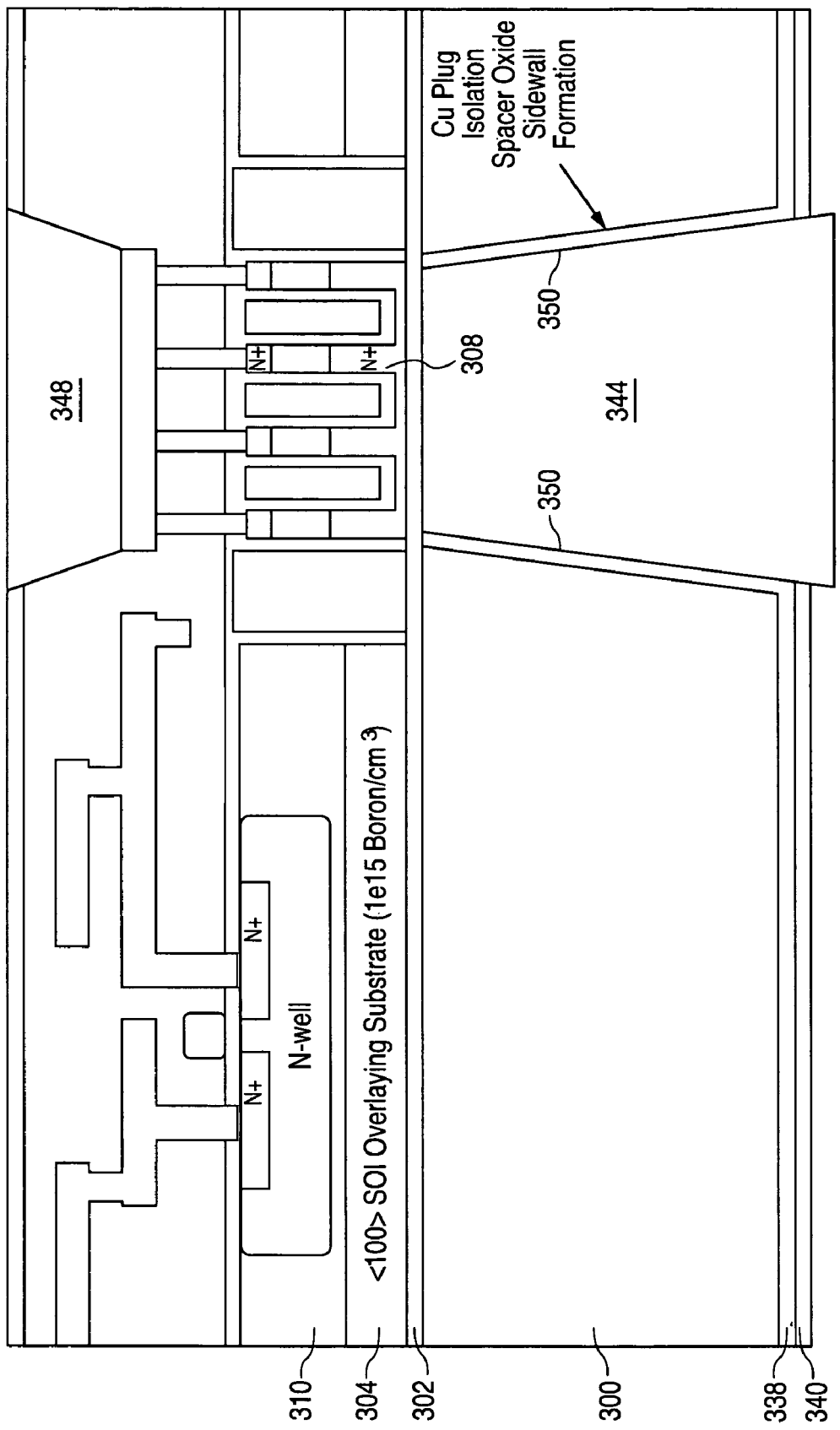
Figure 22:
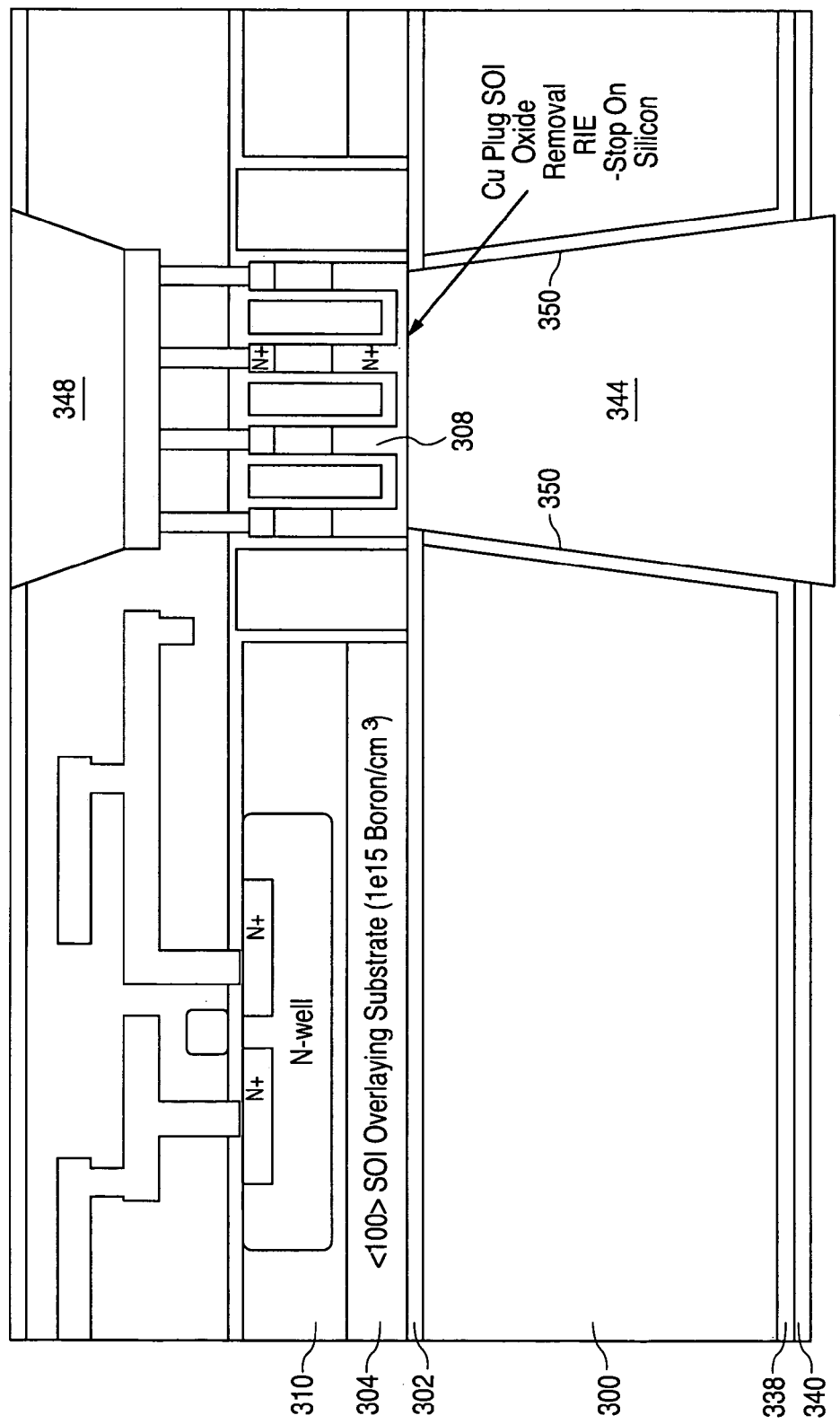
Figure 23:
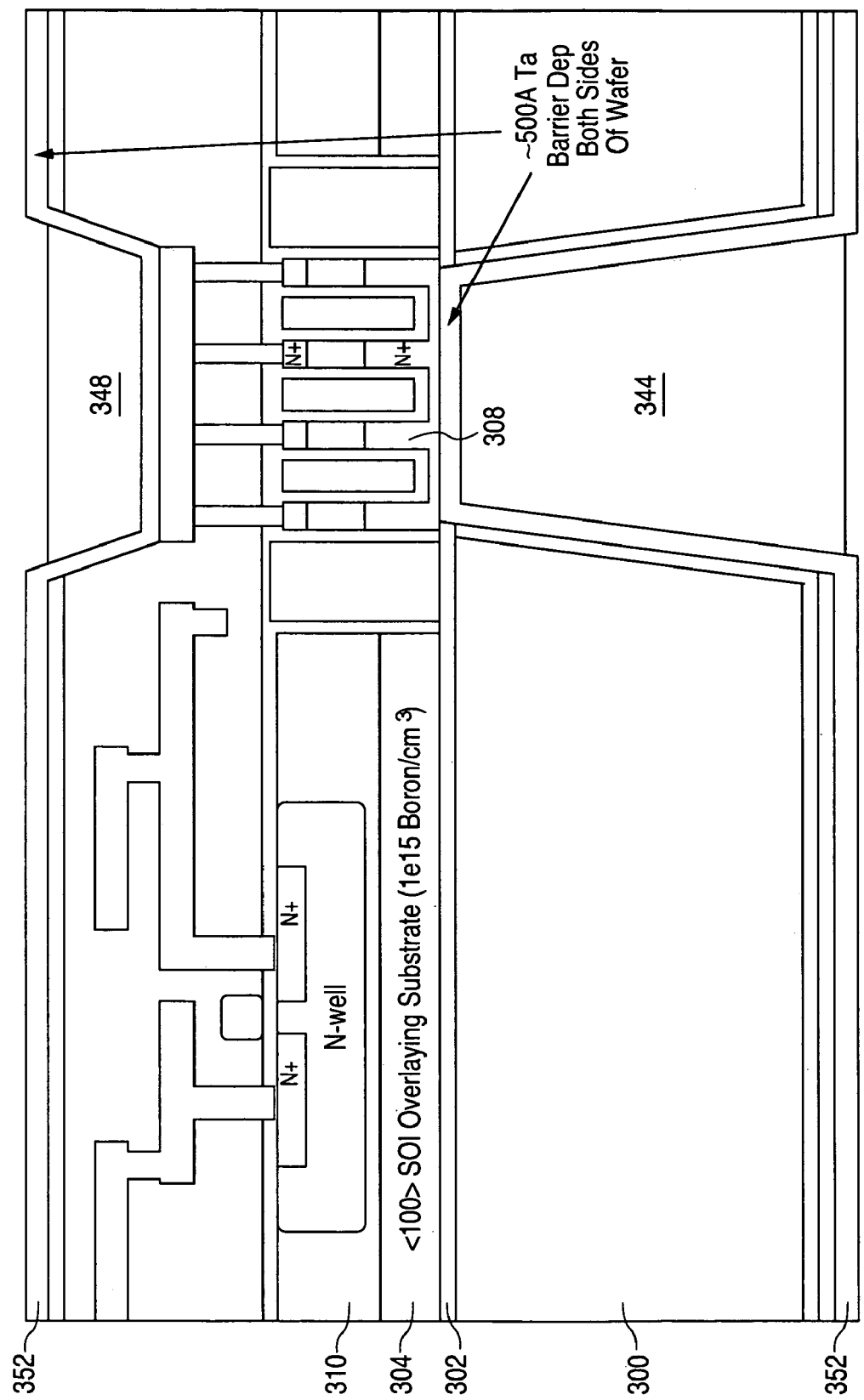

After completion of the backside trench etch, the backside photoresist 342 is stripped and a patterned photomask 346 is developed on the frontside of the wafer to facilitate an extended passivation bond pad etch to develop a trench 348 above the switching transistor, the etch stopping on the overlying aluminum interconnect material, as shown in FIG. 20. Spacer oxide 350 is then formed on the sidewalls of the backside trench 344 to provide copper plug isolation (FIG. 21). SOI oxide 302 is then removed from the backside trench 344 using reactive ion etching (RIE), stopping on N+ silicon 308, as shown in FIG. 22. As shown in FIG. 23, a layer of barrier tantalum (Ta) 352 approximately 500 A° thick is then deposited on both sides of the wafer.

Figure 24:
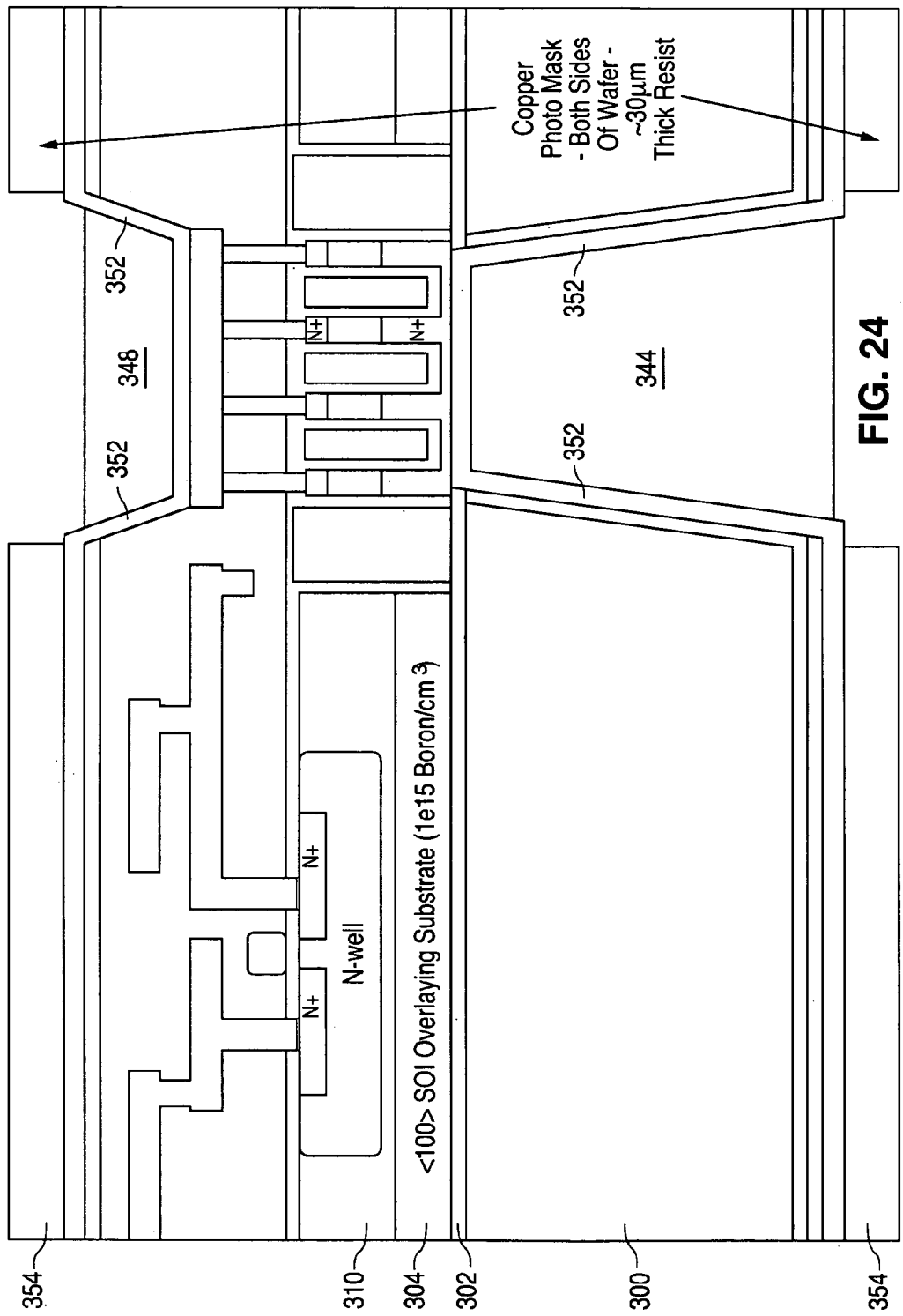
Figure 25:
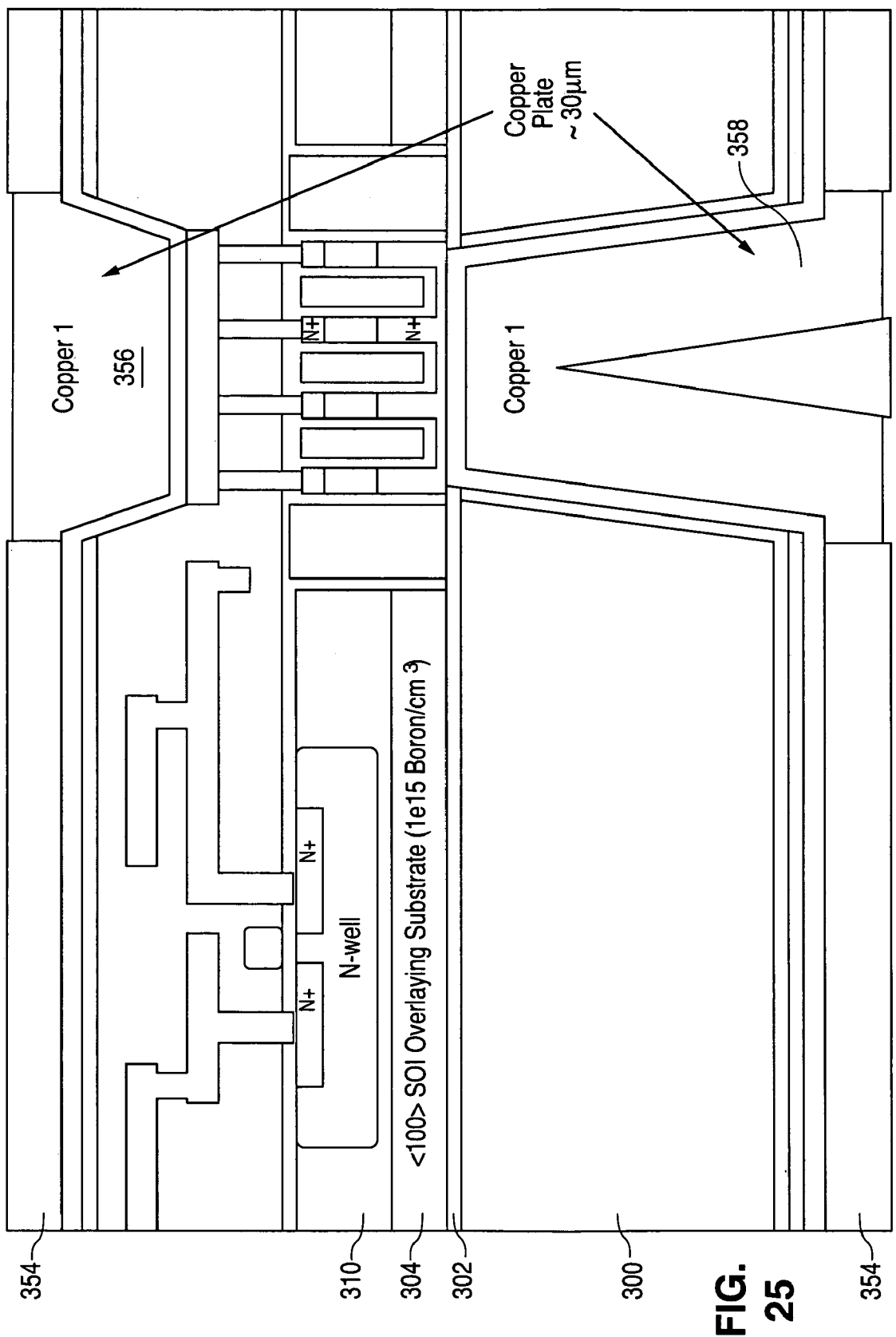
Figure 26:
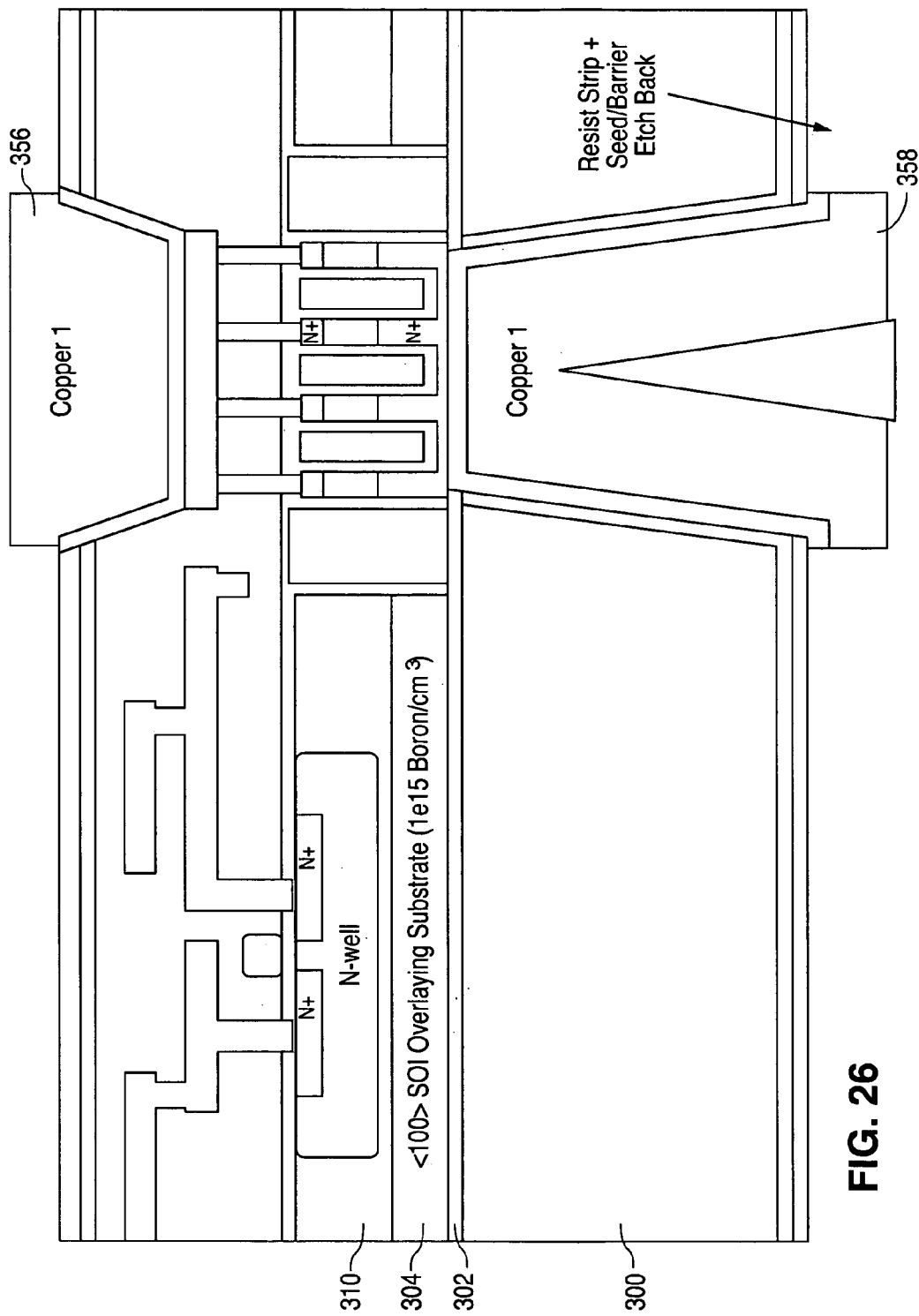

A copper etch photomask 354 about 30 μm thick is then developed on both sides of the wafer, as shown in FIG. 24, and topside copper plating (Copper 1) 356 and backside copper plating (Copper 1) 358 about 30 μm thick is formed in both the topside trench 348 and the backside trench 344, respectively, as shown in FIG. 25. The photomasks 354 are then stripped and a seed/barrier etch back is performed (FIG. 26).

Figure 27:
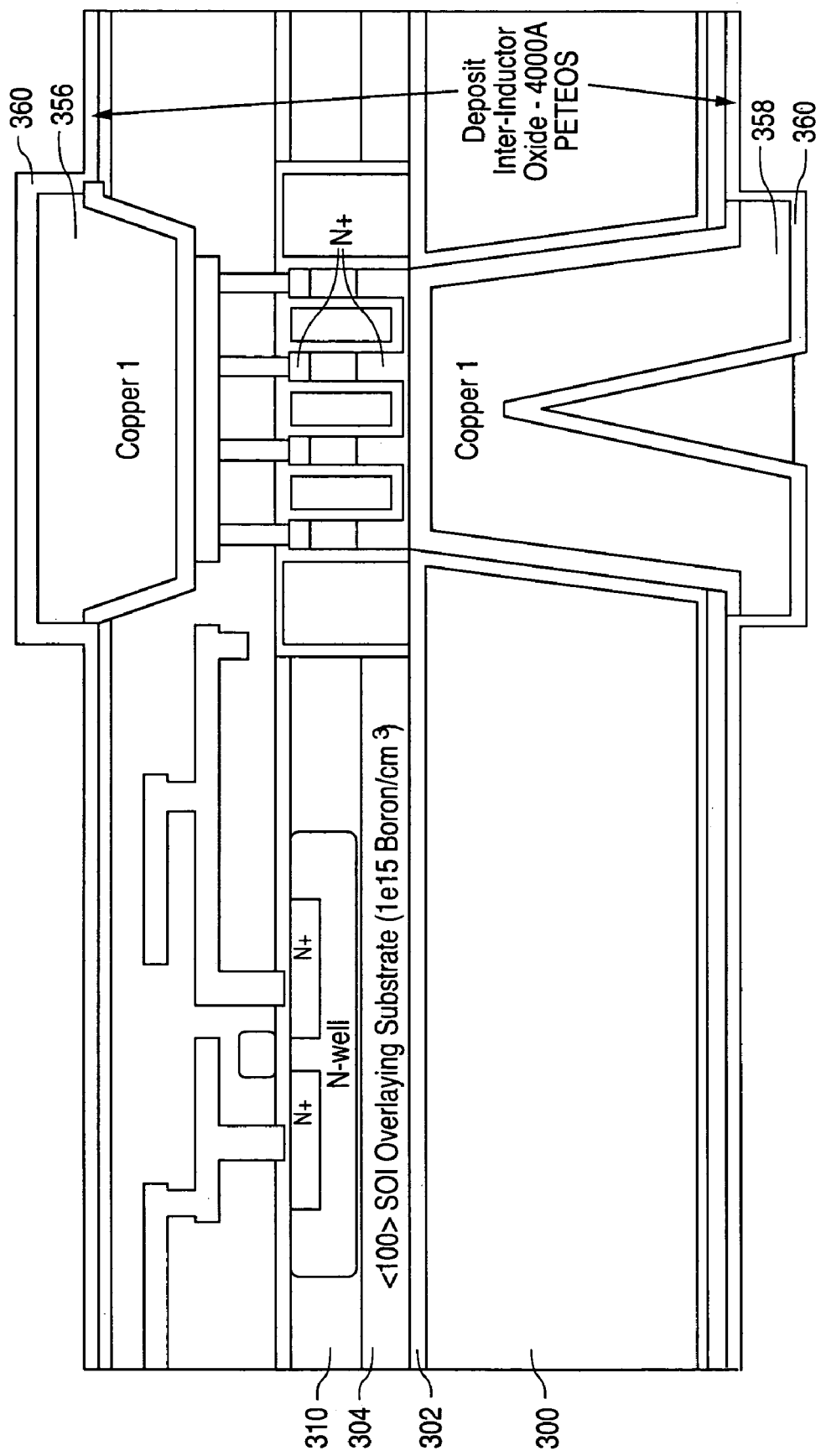
Figure 28:
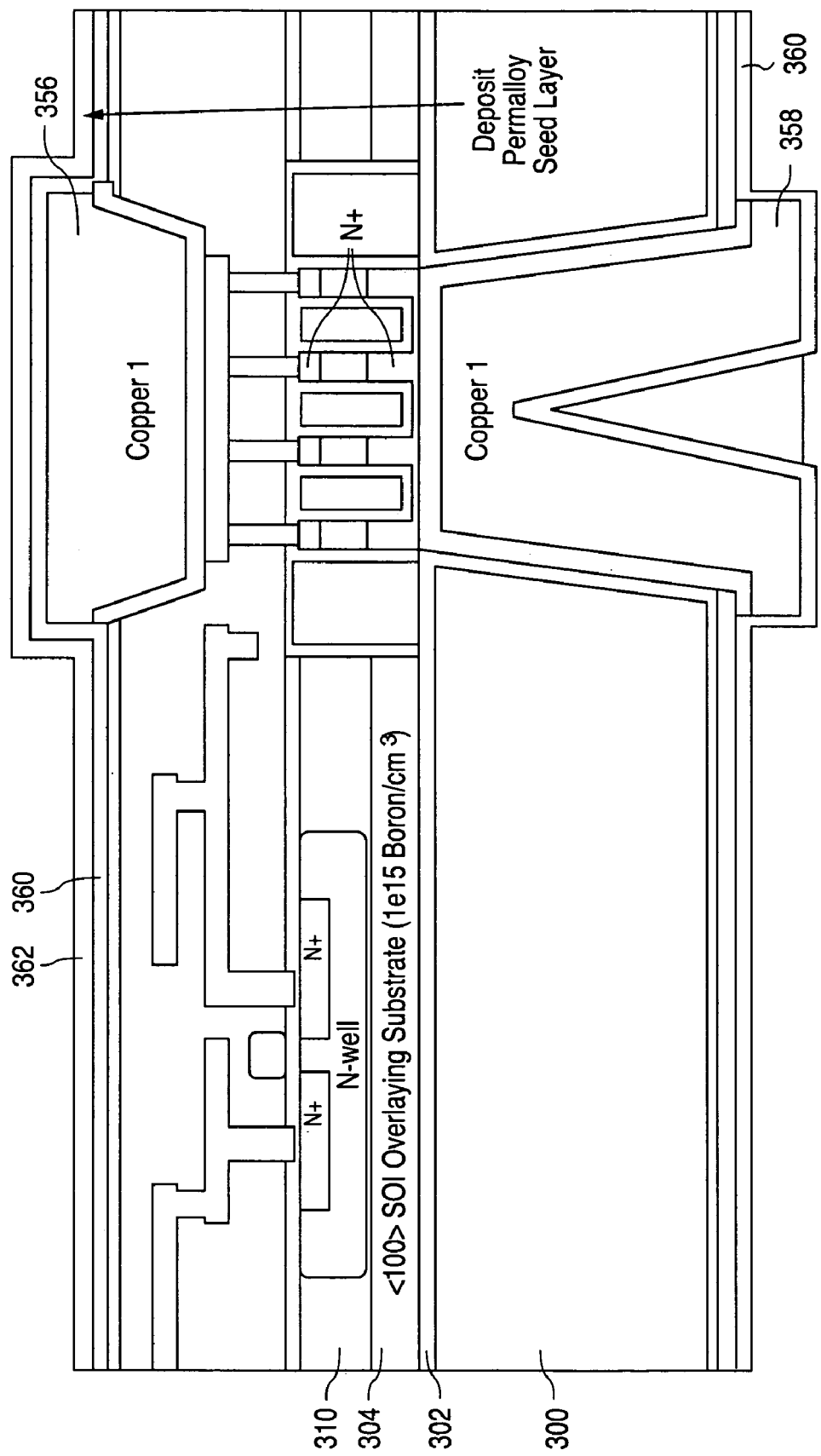
Figure 29:
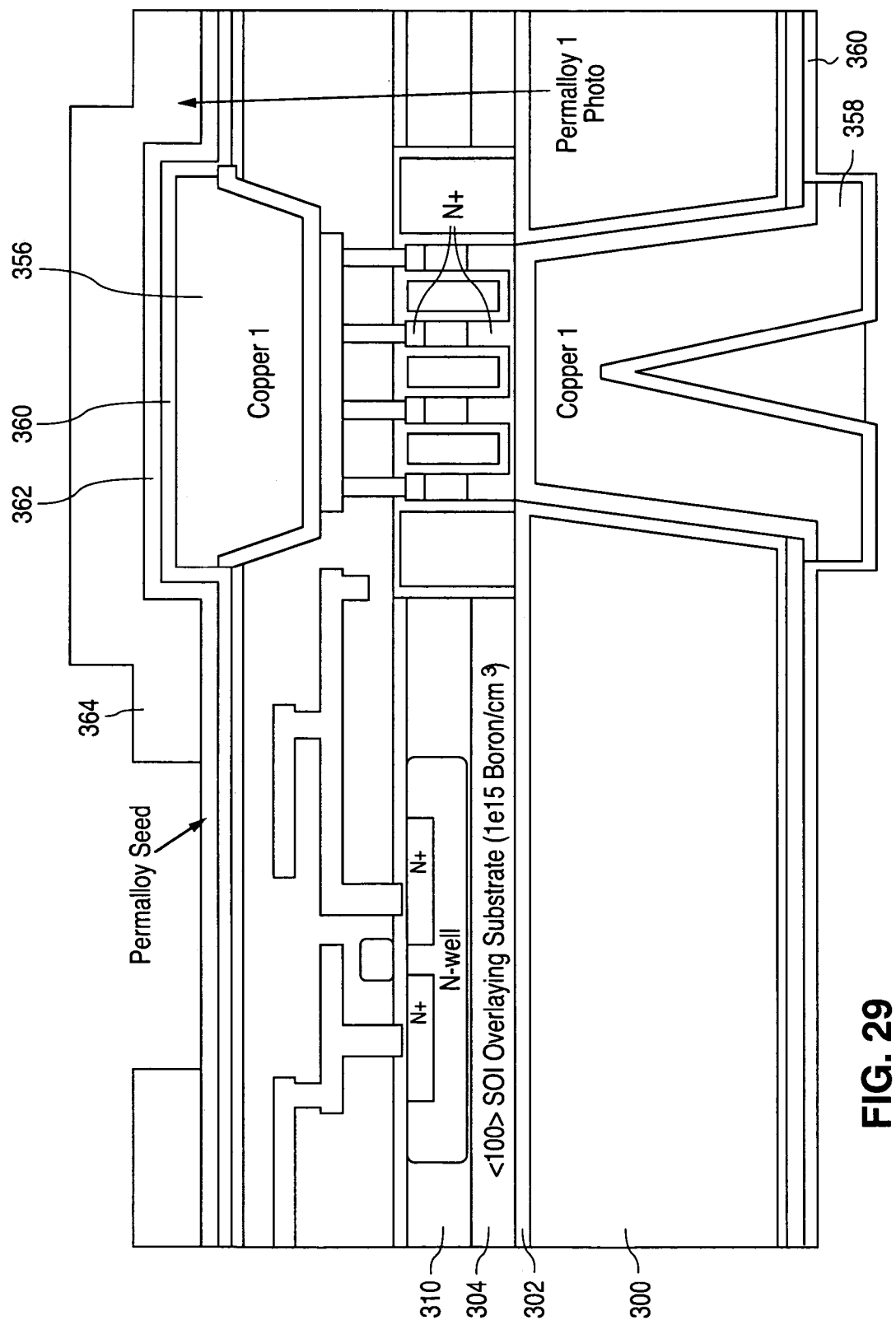
Figure 30:
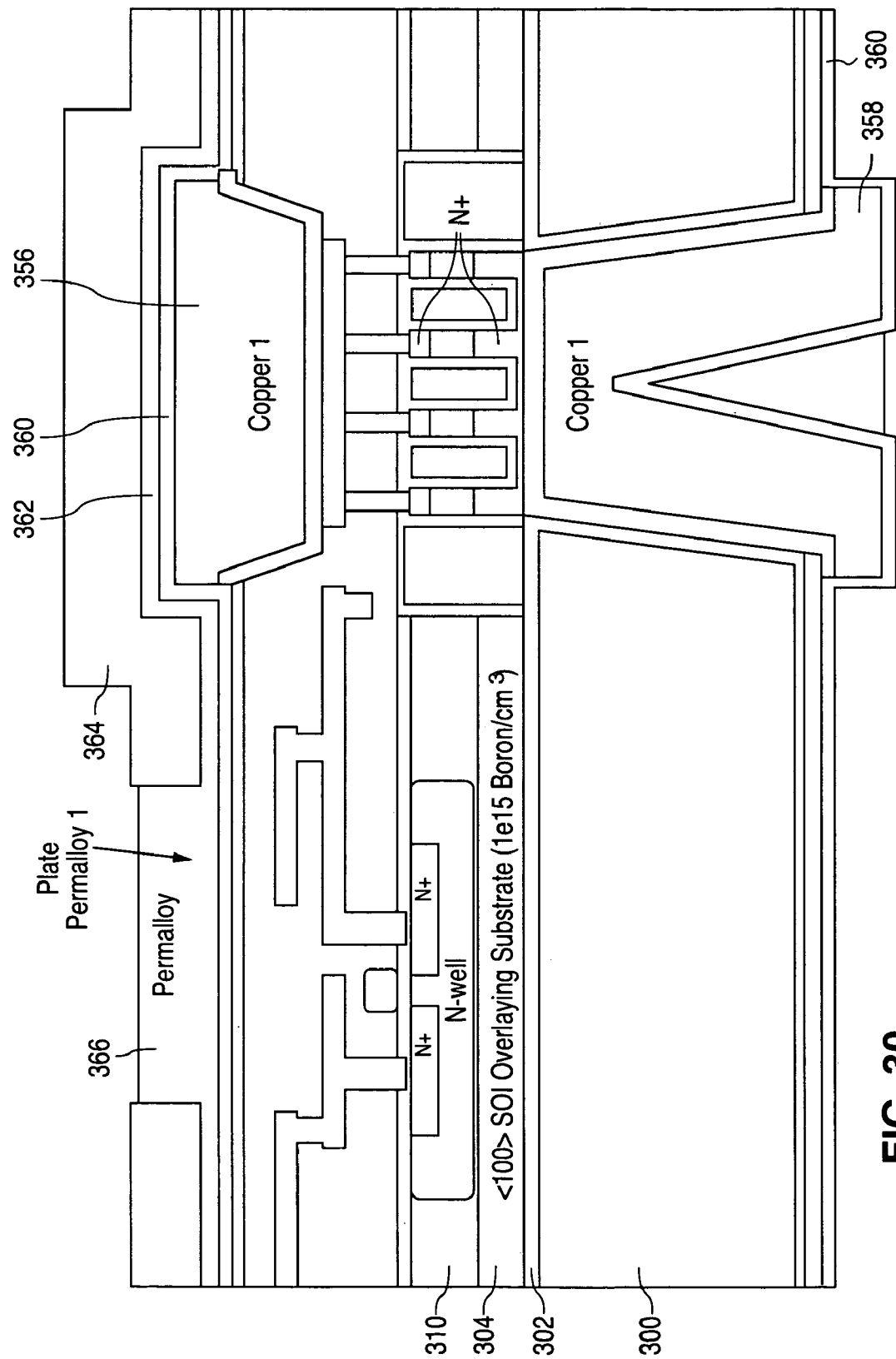
Figure 31:
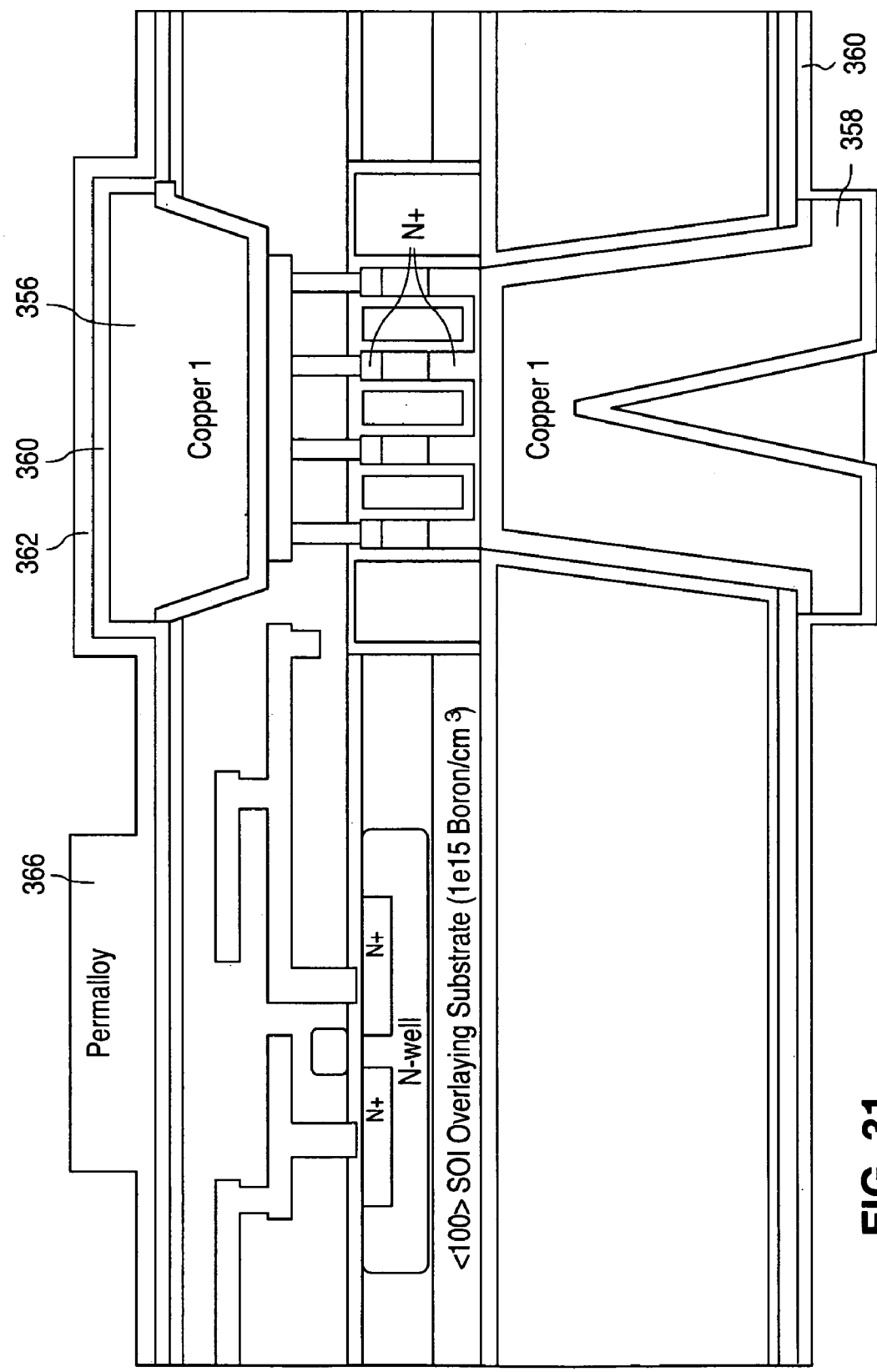
Figure 32:
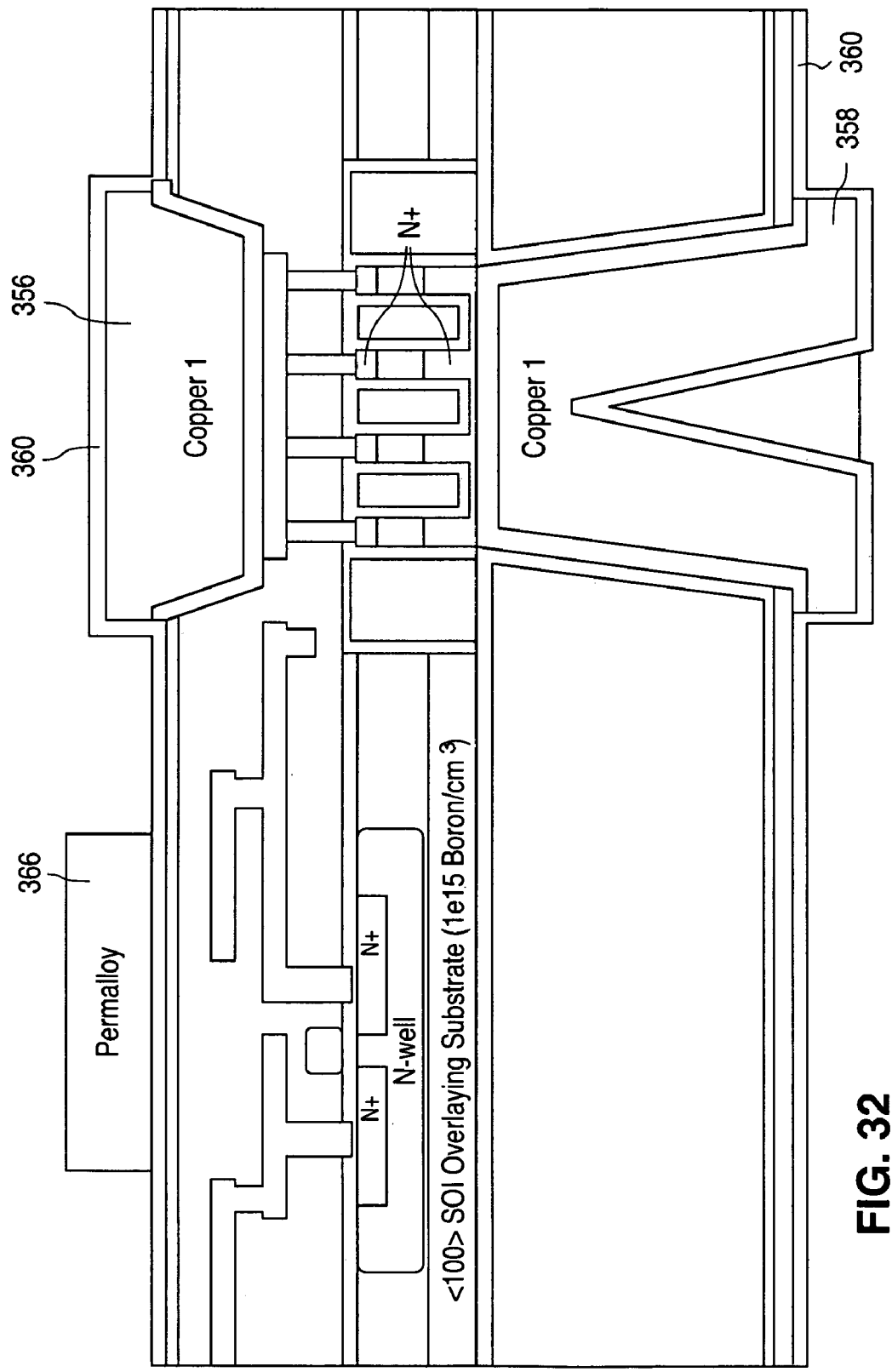
Figure 33:
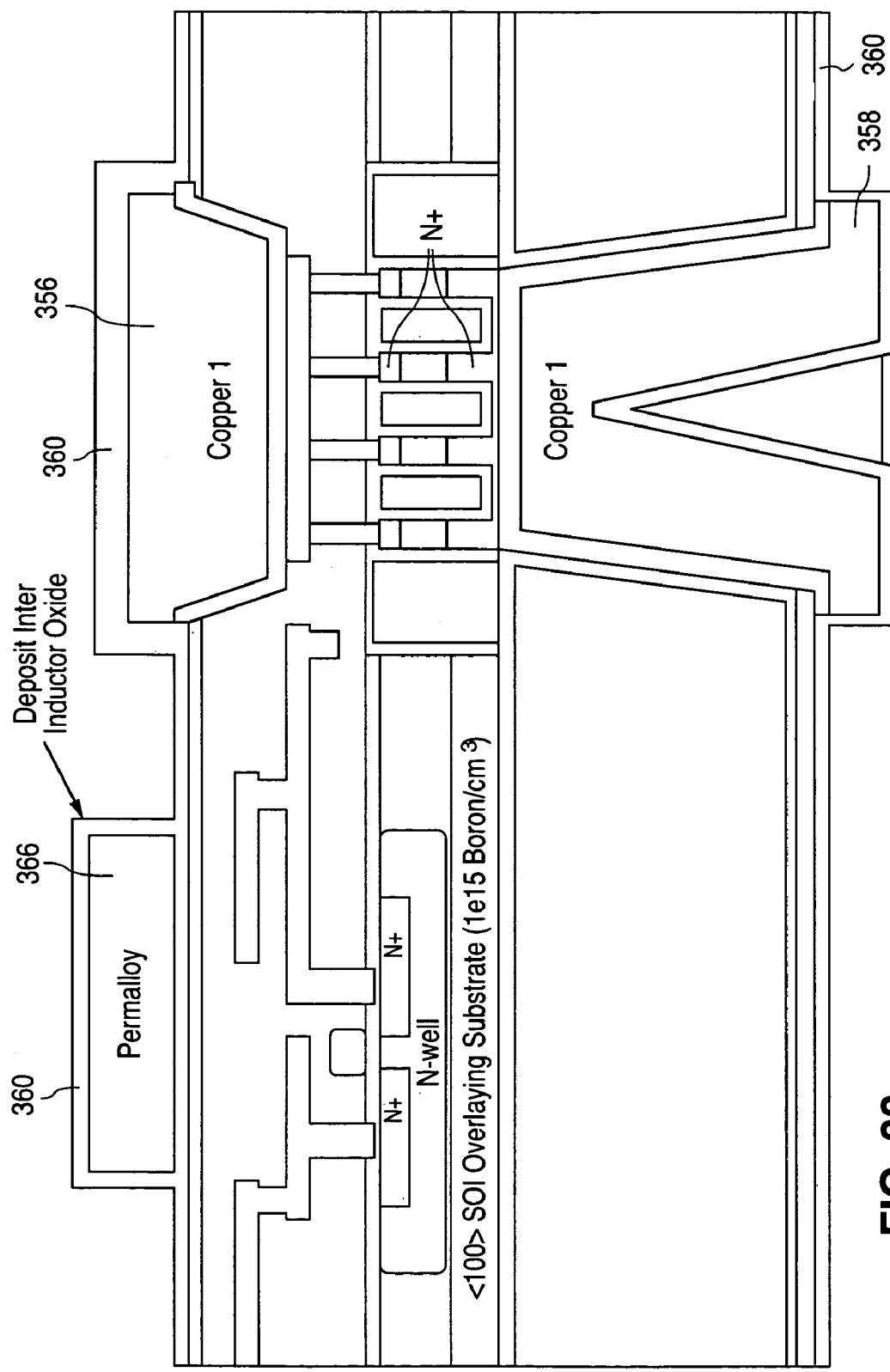

Next, as shown in FIG. 27, inter-inductor PETEOS oxide 360 about 4000 A° thick is deposited on both sides of the wafer, followed by deposition of a Permalloy seed layer 362 on the wafer topside (FIG. 28). A patterned Permalloy photomask 364 is then developed over the Permalloy seed layer 362 (FIG. 29) and Permalloy material 366 is plated into the mask openings, a shown in FIG. 30. The Permalloy mask 364 is then stripped (FIG. 31) and the Permalloy seed is etched back to the inter-inductor oxide layer 360 (FIG. 32). Further inter-inductor oxide 360 is then formed to isolate the plated Permalloy material, as shown in FIG. 33.

Figure 34:
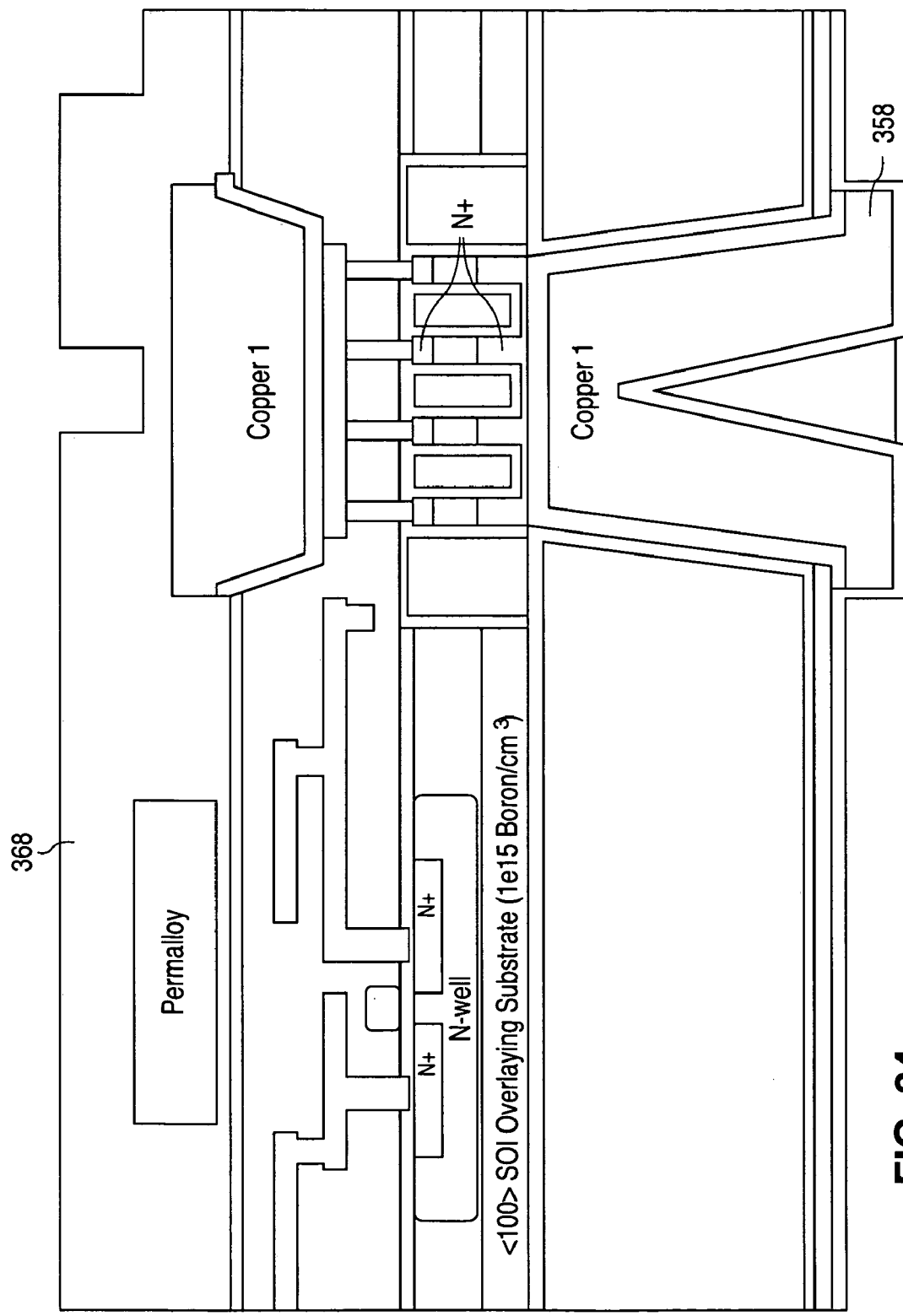
Figure 35:
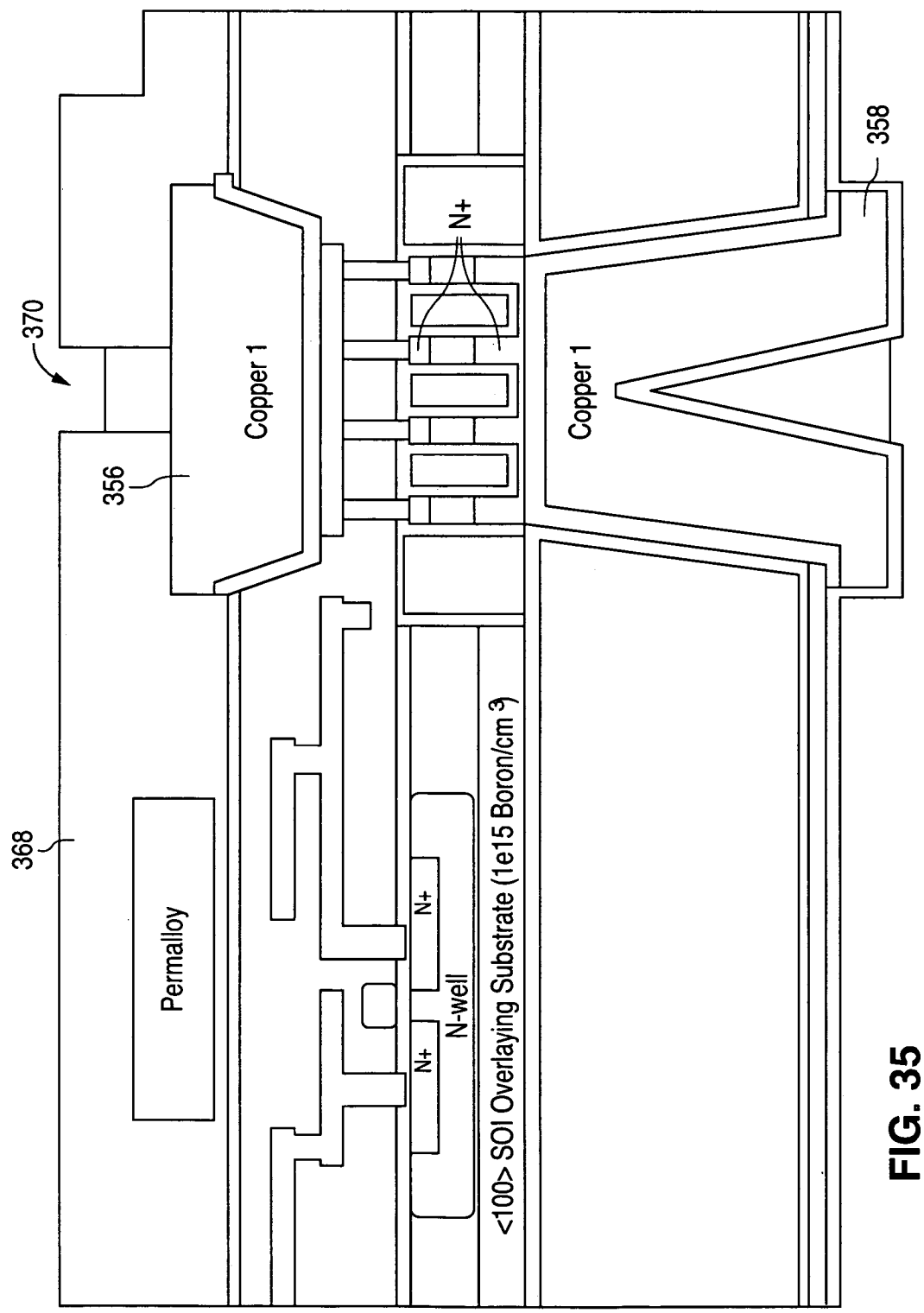
Figure 36:
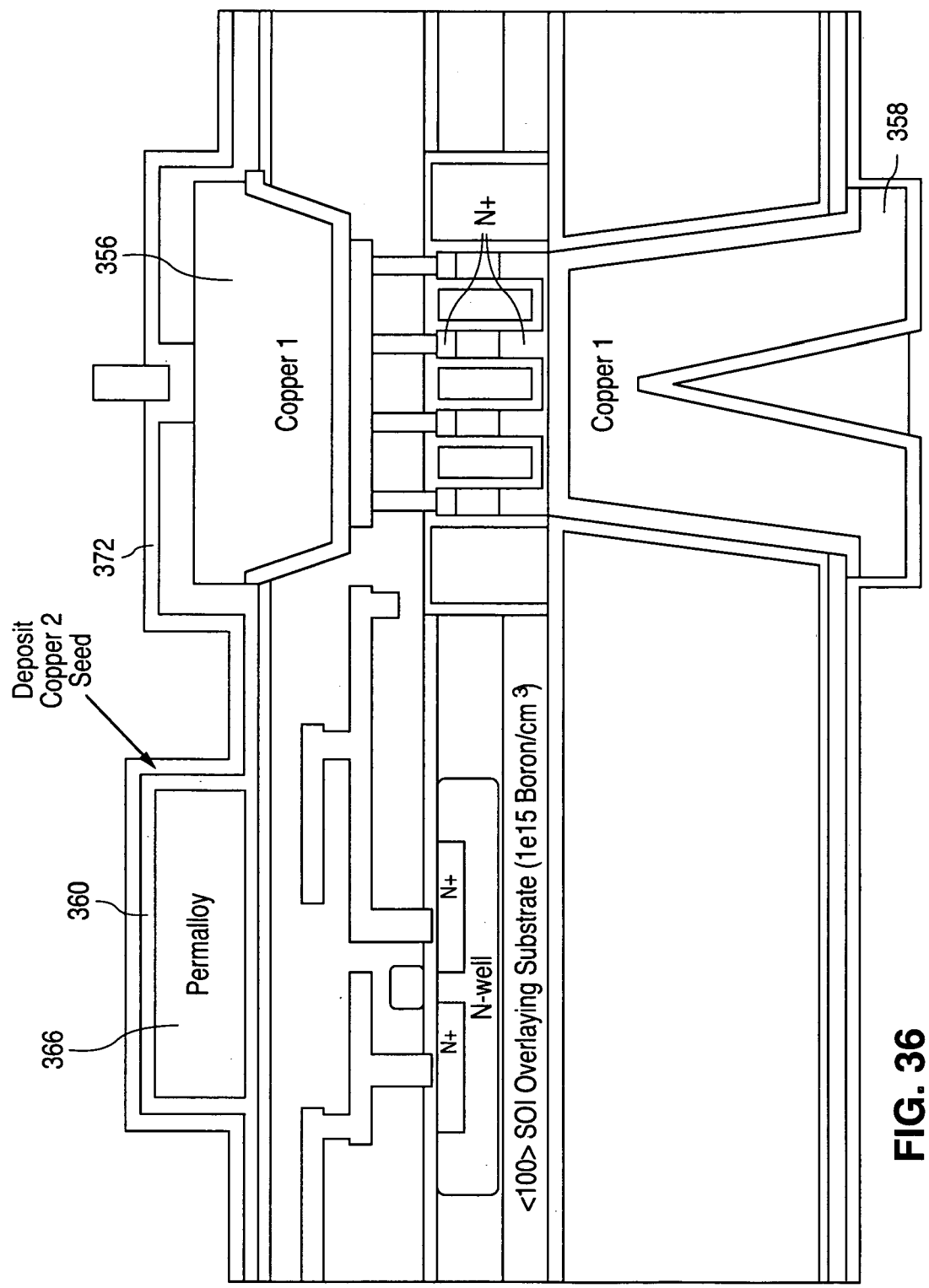
Figure 37:
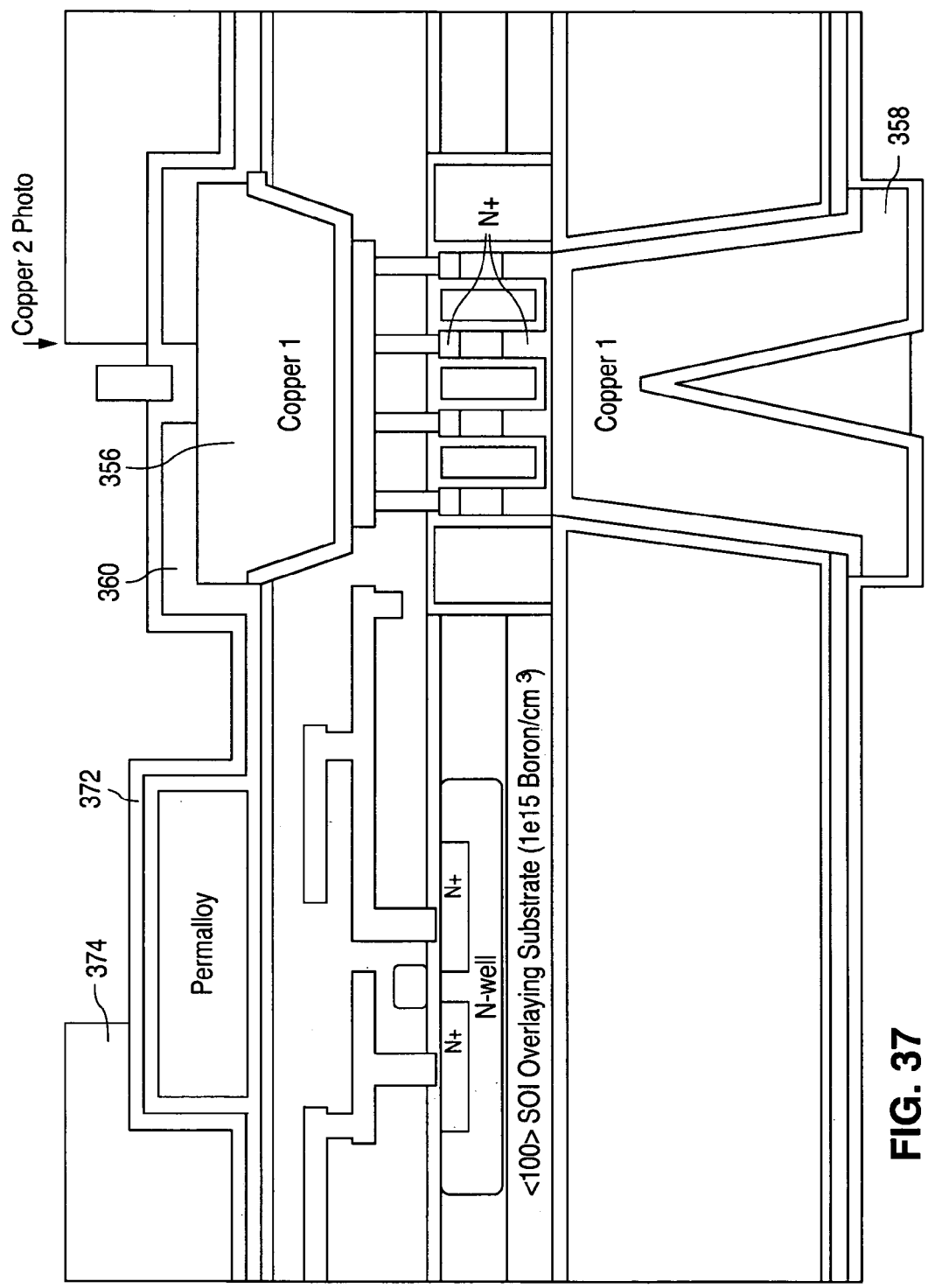
Figure 38:
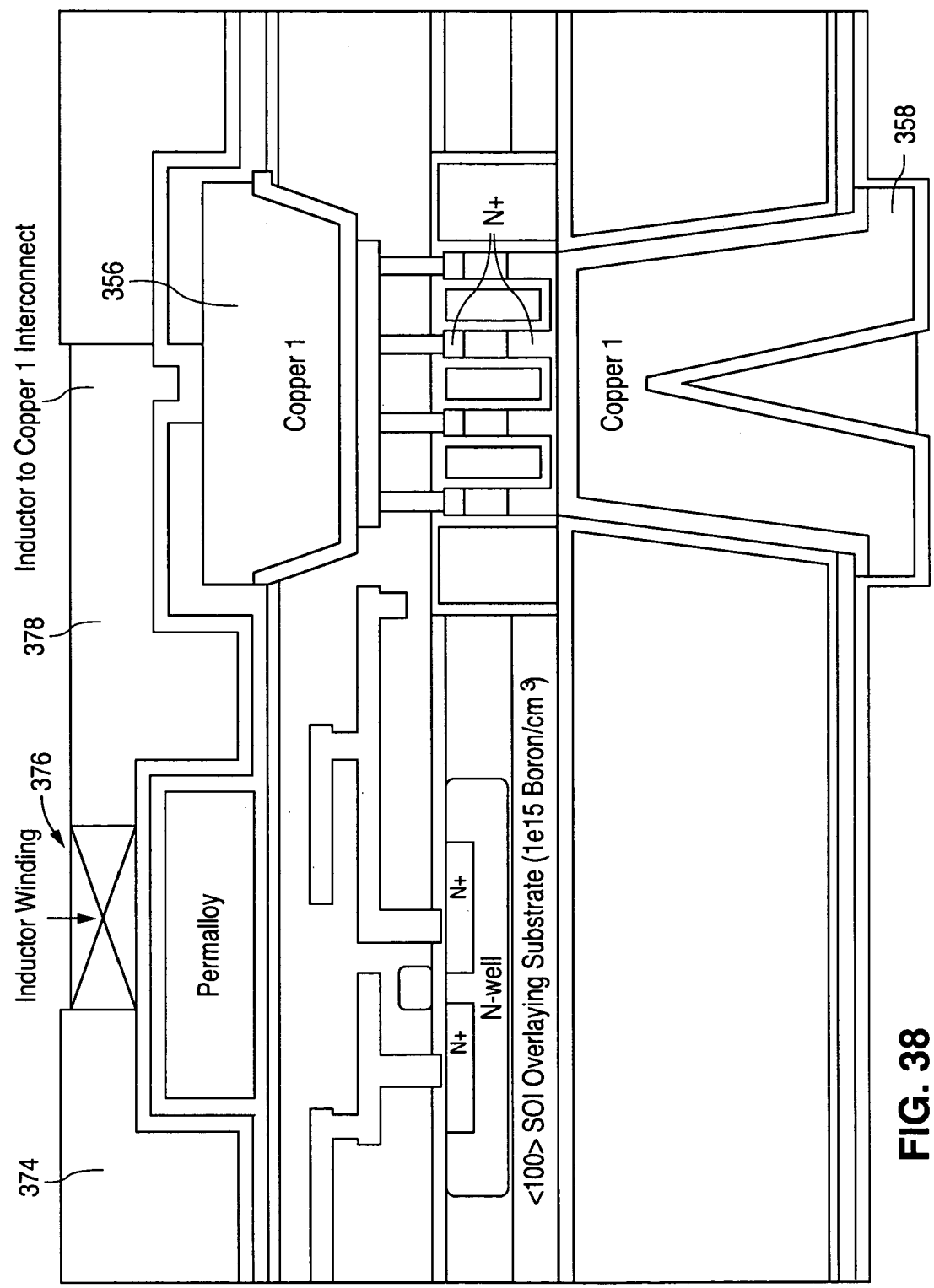
Figure 39:
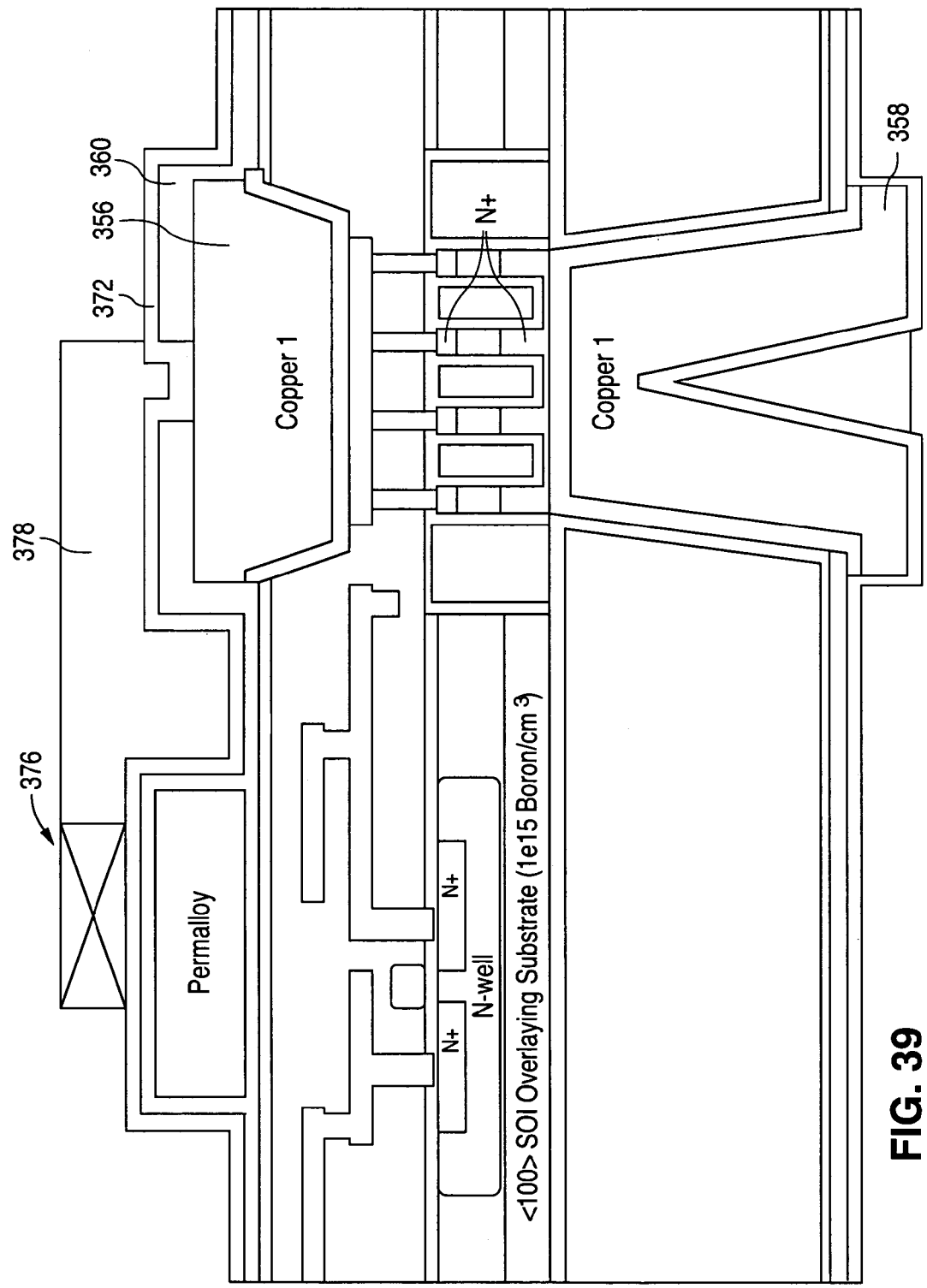
Figure 40:
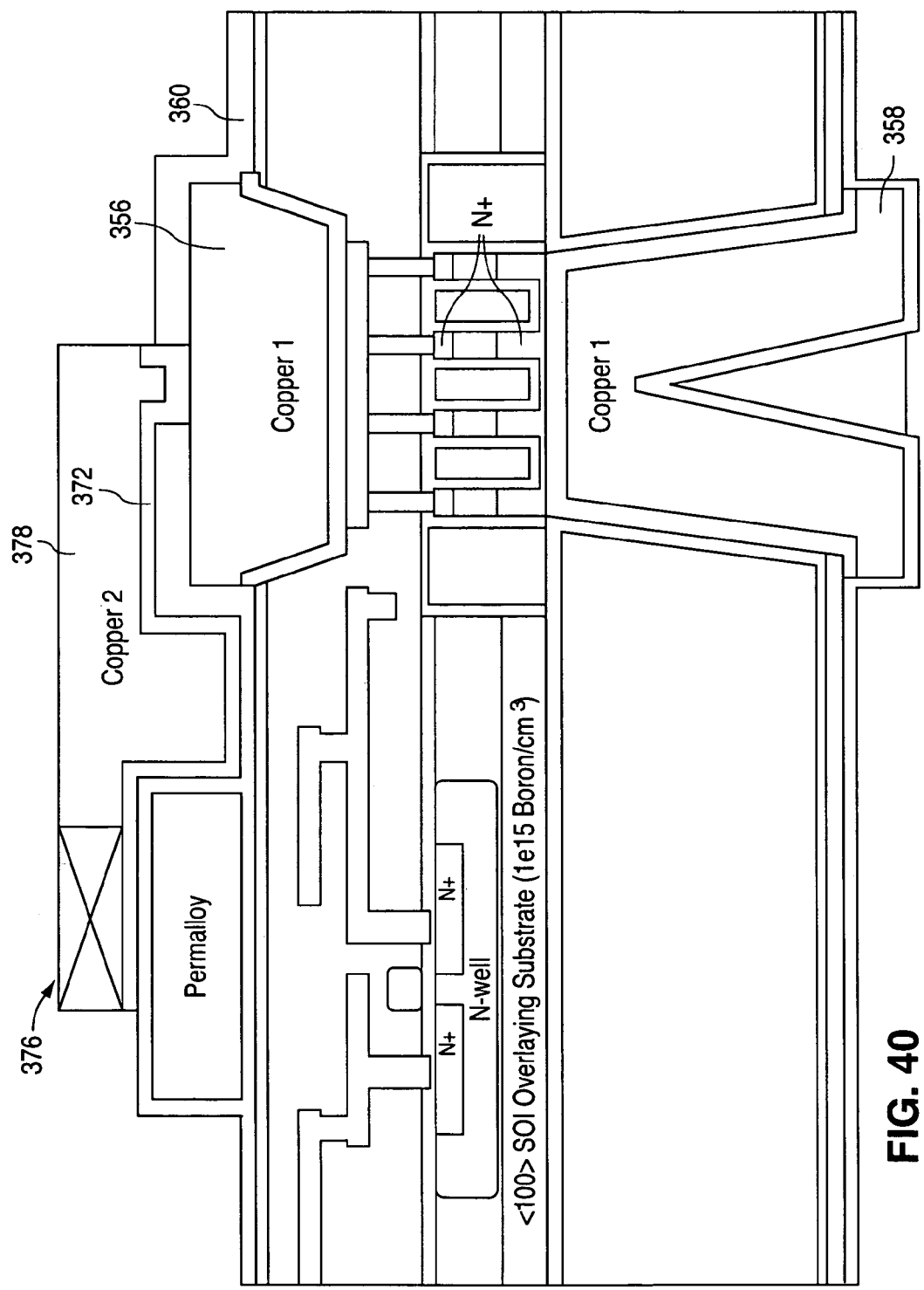

Next, as shown in FIGS. 34 and 35, a copper via photomask 368 is developed and a via 370 is etched to the copper plating 356 above the switching transistor. The copper via photomask 368 is then stripped and a layer of copper seed (Copper 2) 372 is deposited on the topside of the wafer (FIG. 36). A Copper 2 photomask 374 is then developed over the Copper 2 seed layer 372 (FIG. 37) and both the copper inductor windings 376 and the copper interconnect 378 between the inductor windings 376 and the Copper 1 top plate 356 are fabricated, as shown in FIG. 38. The Copper 2 photomask 374 is then stripped (FIG. 39). A Copper 2 seed etch back step is then performed (FIG. 40).

Figure 41:
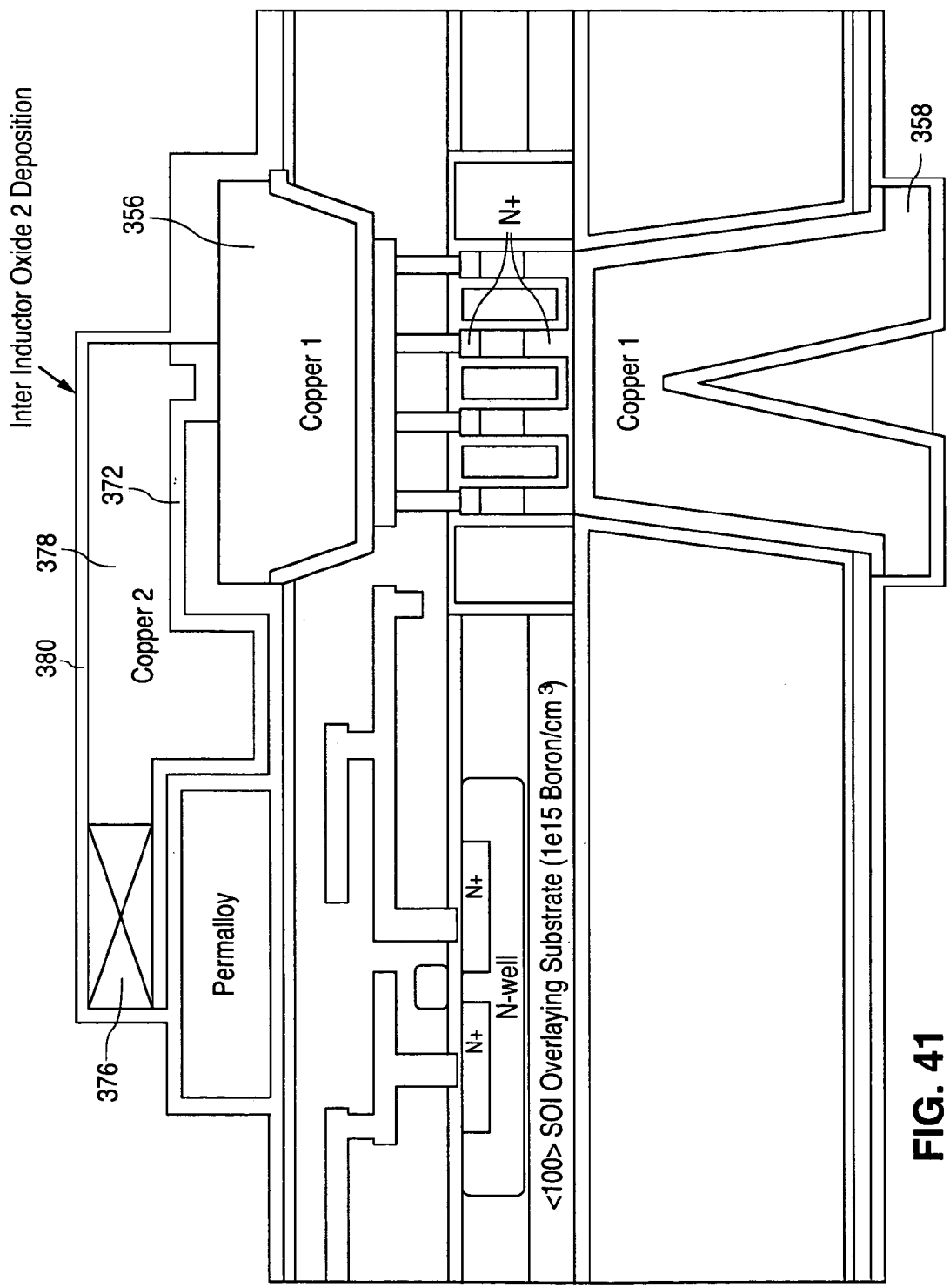
Figure 42:
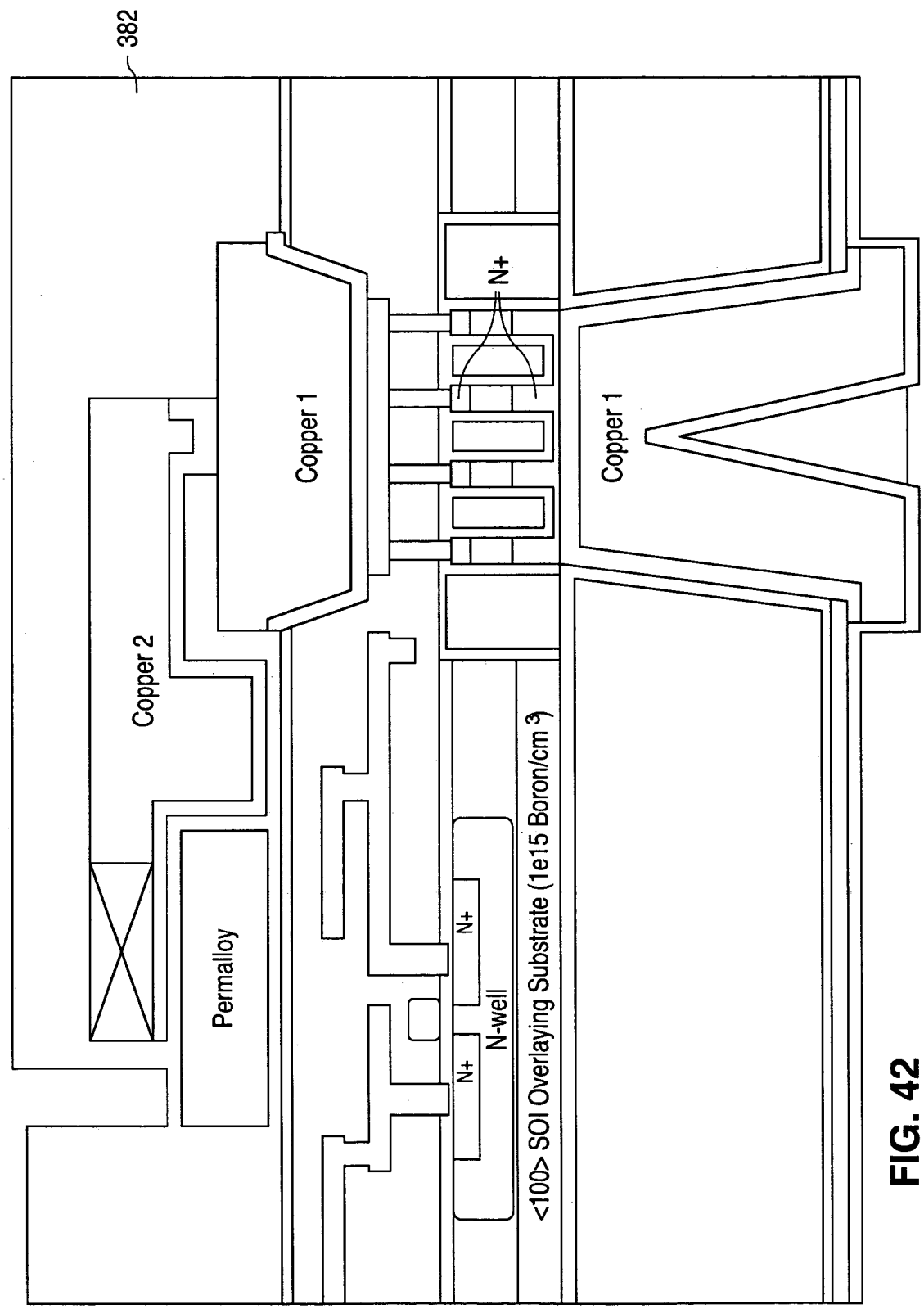
Figure 43:
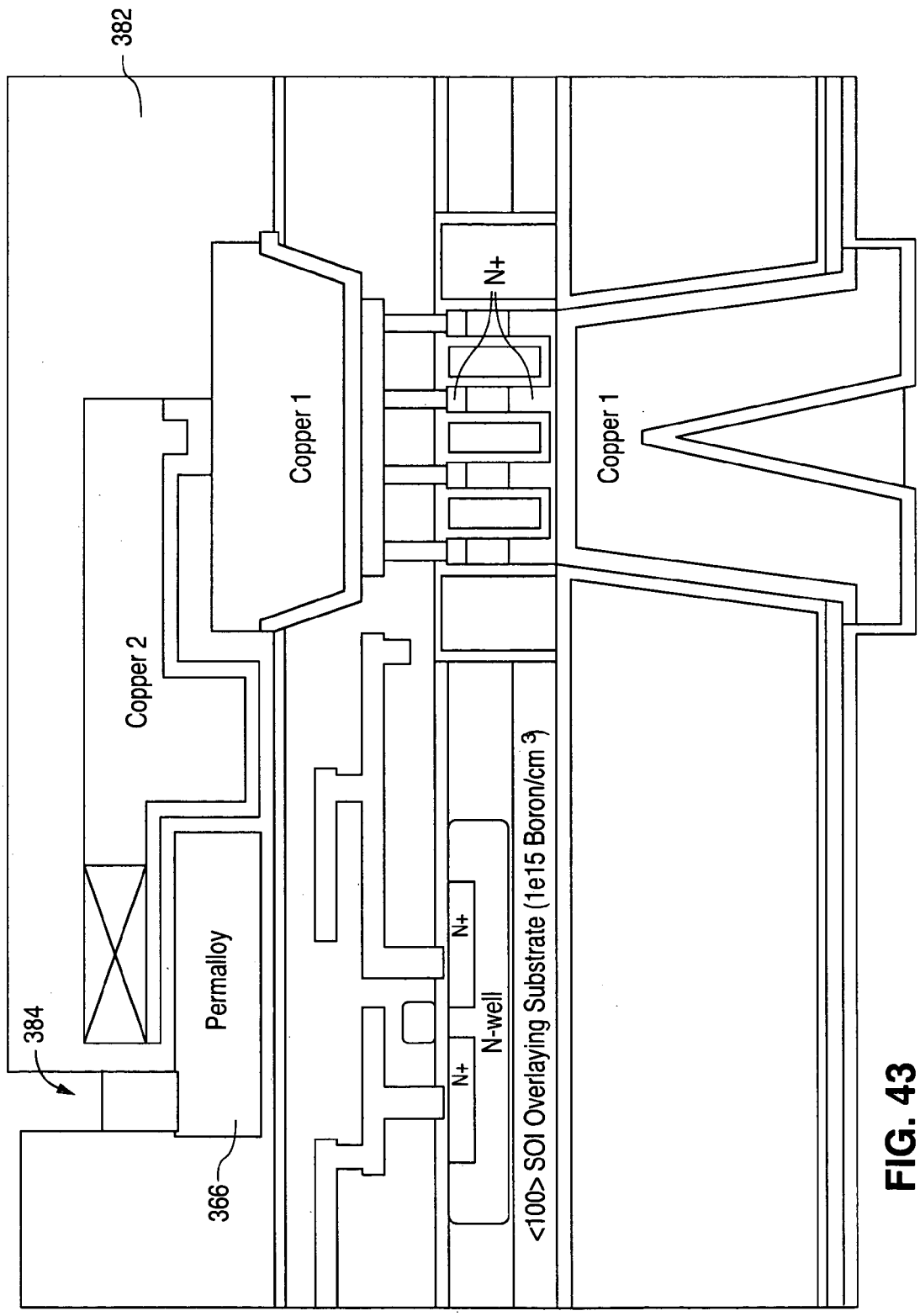

A layer of inter-inductor oxide 380 is then deposited to isolate the Copper 2 inductor winding/interconnect material 376/378, as shown in FIG. 41. A Permalloy via photomask 382 is then developed on the topside of the wafer and Permalloy via 384 is etched through the oxide to provide for contact to the Permalloy material 366, as shown in FIG. 43.

The remainder of the process proceeds in accordance with conventional integrated circuit fabrication techniques that are well known to those skilled in the art.

The market evolution of DC-DC power supply systems indicates that an integrated on-chip inductor with a large inductance and a good Q factor offers a significant market advance in terms of cost competitiveness. New inductor integration schemes are needed to meet these related demands for high values of inductance (with value of 50 nH and greater).

Historically, on-chip inductors are made using interconnect metals on top of a silicon wafer. To reduce resistance of the inductor spiral, thick and wide metal lines were used, increasing the overall size of the inductor. Further, power inductors for DC-DC power supply applications, for example, require even more current carrying capabilities along with larger values of inductance.

The fully integrated DC-DC switching regulator circuit structure described above utilizes a high inductance, integrated, on-chip inductor structure that has advantages for power applications. As described above, the inductor coil is made of thick metal to reduce resistance. To increase the inductance of the coil, top and bottom magnetic plates are added. The magnetic plates are made of a high permeability material such as ferromagnetic metal alloys, e.g. Permalloy. To further improve the performance of the inductor, the magnetic plates are patterned or made into broken pieces. This patterning of the magnetic layers reduces the eddy current effect, which degrades the performance of the inductor.

Figure 44A:
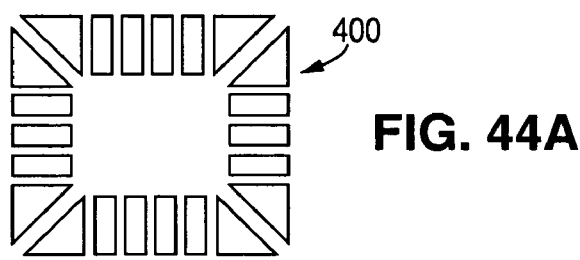
FIGS. 44A-44C are top views illustrating the top patterned magnetic plates, the conductor spiral and the bottom patterned magnetic plates, respectively, of an embodiment of a spiral inductor structure utilizable in the FIG. 4 fully integrated DC-DC switching regulator circuit structure.
Figure 44B:
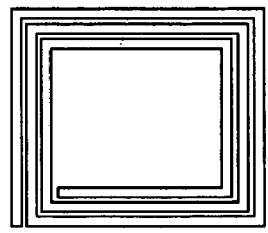
Figure 44C:
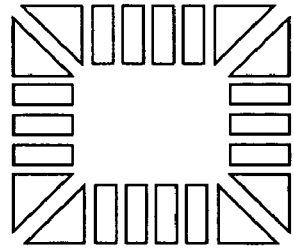

FIGS. 44A-44C combine to show the inductor structure. FIG. 44A shows the top patterned magnetic plates 400. FIG. 44B shows the conductor spiral 402. FIG. 44C shows the bottom patterned magnetic plates 404. Although FIGS. 44A-44C show one way of patterning the magnetic layers, those skilled in the art will appreciate that other patterns may also be utilized. While it is also known that the magnitude of the eddy current decreases as the size of the pattern increase, the pattern spacing and pitch are limited by process parameters such as magnetic layer thickness and etch angle.

Figure 45:
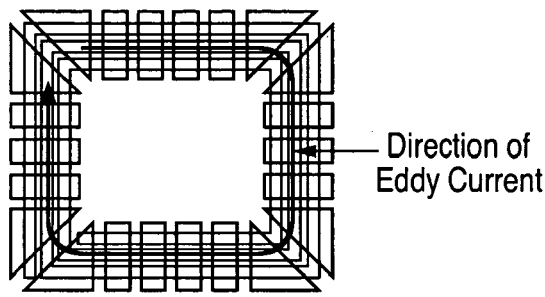
FIG. 45 is a top view illustrating the direction of the eddy currents in the spiral inductor structure shown in FIGS. 44A-44C in accordance with the concepts of the present invention.

FIG. 45 shows a top view of the inductor spiral 402 and patterned magnetic layer. When current flows along the inductor coil, eddy current inside the magnetic layer is induced in the same direction as the coil, as shown in FIG. 45. Thus, by patterning the magnetic layer perpendicular to the eddy current path, the magnitude of the eddy current can be reduced.

Figure 46:
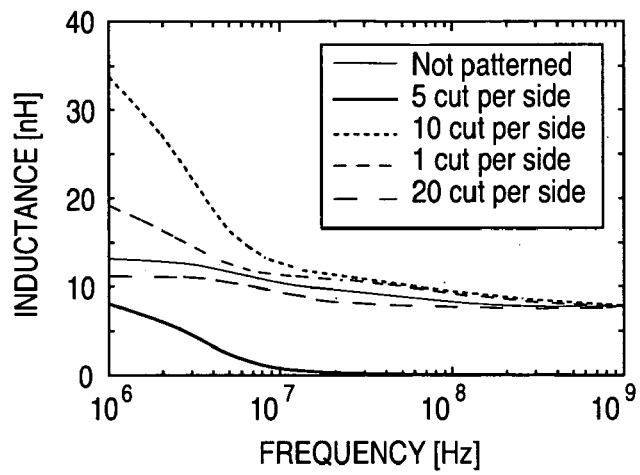
FIG. 46 provides a graph showing simulated inductance as a function of the number of cuts on each side of a magnetic layer in the spiral inductor structure shown in FIGS. 44A-44C.

FIG. 46 shows simulated inductance as a function of the number of cuts on each side of the magnetic layer. As can be seen from the FIG. 46 plot, when there is no cut, inductance decreases significantly at high frequency. As the number of cuts increases, inductance increases at low frequency.

Figure 47A:
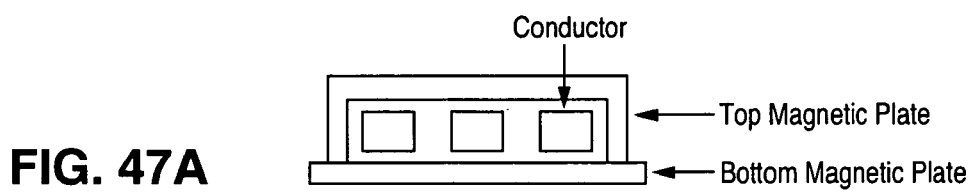
FIG. 47A is a cross section view showing the top and bottom magnetic layers of the FIGS. 44A-44C spiral inductor structure touching each other.
Figure 47B:
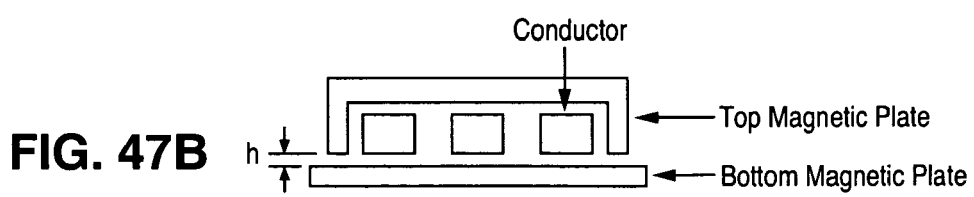
FIG. 47B is a cross section view showing the top and bottom magnetic layers of the FIGS. 44A-44C spiral inductor structure having a finite gap therebetween.
Figure 48:
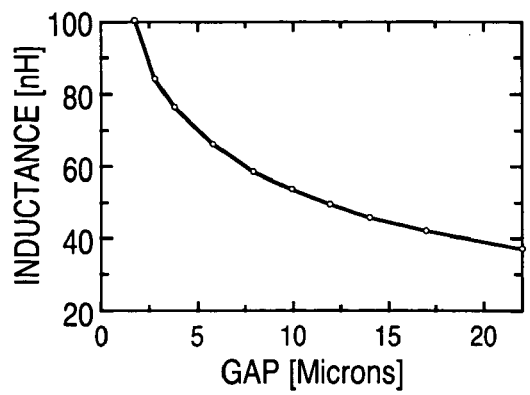
FIG. 48 provides a graph showing simulated inductance as a function of the height of the gap between the top and bottom magnetic plates in the FIG. 47B spiral inductor structure.

FIGS. 47A and 47B show cross-section views of the magnetic inductor. In the FIG. 47A embodiment, the top magnetic layer and the bottom magnetic layer touch each other; large inductance can be made by this configuration, since reluctance is minimized. In the FIG. 47B embodiment, there is a finite gap between the top magnetic layer and the bottom magnetic layer. The magnetic path is composed of the magnetic layer and the gap. Total inductance can be adjusted by changing the gap height. Also, magnetic saturation due to high current level can be controlled by the gap height. FIG. 48 shows simulated inductance as a function of the height of the gap between the top magnetic plate and the bottom magnetic plate. As can be seen from the FIG. 48 plot, inductance increases as the gap size decreases.

It should be understood that the particular embodiments of the invention described above have been provided by way of example and that other modifications may occur to those skilled in the art without departing from the scope and spirit of the invention as expressed in the appended claims and their equivalents.

What is claimed is:

1. An integrated switching voltage regulator circuit comprising:
   a diode anode layer of P-type semiconductor material;
   a diode cathode layer of N-type semiconductor material formed on an upper surface of the diode anode layer such that the diode anode layer and the diode cathode layer combine to form a diode structure of the switching voltage regulator circuit;
   a switching transistor formed over and extending into the diode cathode layer;
   an inductor formed over the diode cathode layer and spaced apart therefrom by intervening dielectric material, the inductor also being spaced apart from the switching transistor;
   a conductive interconnect structure disposed to electrically interconnect the diode structure, the switching transistor and the inductor, the conductive interconnect structure including a conductive voltage supply contact formed to extend from a lower surface of the diode anode layer through the diode anode layer and a portion of the diode cathode layer and into electrical contact with the switching transistor;
   and wherein the switching voltage regulator circuit is adapted for connection to a capacitor.

2. An integrated switching voltage regulator circuit as in claim 1, and wherein the conductive interconnect structure comprises copper.

3. An integrated switching voltage regulator circuit as in claim 1, and wherein the conductive supply voltage contact comprises copper.

4. An integrated switching voltage regulator circuit as in claim 1, and wherein the inductor comprises a Permalloy inductor core and a copper inductor coil.

5. An integrated switching voltage regulator circuit as in claim 4, and wherein the switching transistor includes a copper source switching node that is connected to the copper inductor coil.

6. An integrated switching voltage regulator circuit as in claim 5, and wherein the copper source switching node is connected to the diode structure.

7. A method of making an integrated switching voltage regulator circuit, the method comprising:
   forming a diode anode layer of P-type semiconductor material;
   forming a diode cathode layer of N-type semiconductor material on an upper surface of the diode anode layer such that the diode anode layer and the diode cathode layer combine to form a diode structure of the switching voltage regulator circuit;
   forming a switching transistor over and extending into the diode cathode layer;
   forming an inductor over the diode cathode layer and spaced apart therefrom by intervening dielectric material, the inductor also being spaced apart from the switching transistor;
   forming a conductive interconnect structure that electrically interconnects the diode structure, the switching transistor and the inductor, the conductive interconnect structure being formed to include a conductive voltage supply contact that extends from a lower surface of the diode anode layer through the diode anode layer and a portion of the diode cathode layer and into electrical contact with the switching transistor, and
   wherein the switching voltage regulator circuit is adapted for connection to a capacitor.

8. A method as in claim 7, and wherein the conductive interconnect structure comprises copper.

9. A method as in claim 7, and wherein the conductive supply voltage contact comprises copper.

10. A method as in claim 7, and wherein the inductor comprises a Permalloy inductor core and a copper inductor coil.

11. A method as in claim 10, and wherein the switching transistor includes a copper source switching node that is connected to the copper inductor coil.

12. A method as in claim 11, and wherein the copper source switching node is connected to the diode structure.

* * * * *